United States Patent

Nonomura et al.

[19]

[11] Patent Number: 5,915,067
[45] Date of Patent: Jun. 22, 1999

[54] MULTIMEDIA OPTICAL DISC FACILITATING BRANCH REPRODUCTION TO PARENTAL LOCK SECTIONS USING REDUCED CONTROL INFORMATION AND A REPRODUCING DEVICE FOR SAID DISC

[75] Inventors: Tomoyuki Nonomura, Osaka; Masayuki Kozuka, Neyagawa; Yoshihisa Fukushima, Osaka; Kazuhiko Yamauchi, Neyagawa; Kaoru Murase, Ikoma-gun; Katsuhiko Miwa, Osaka, all of Japan

[73] Assignee: Matsushita Electric Industiral Co., Ltd., Osaka, Japan

[21] Appl. No.: 08/699,531

[22] Filed: Aug. 19, 1996

[30] Foreign Application Priority Data

Aug. 21, 1995 [JP] Japan .................................... 7-211945

[51] Int. Cl.$^6$ .............................. H04N 5/76; H04N 5/781
[52] U.S. Cl. ................................ 386/70; 386/95; 386/126
[58] Field of Search .................................. 386/92, 95, 70, 386/96, 4, 40, 52, 108, 125–126; 358/906, 909.1; 369/47, 48, 54, 59, 124, 272, 275.1–275.5; H04N 5/781, 5/92, 5/91, 7/08

[56] References Cited

U.S. PATENT DOCUMENTS

| | | |
|---|---|---|
| 4,953,035 | 8/1990 | Yoshio . |
| 5,043,826 | 8/1991 | Yoshio et al. . |
| 5,065,252 | 11/1991 | Yoshio et al. . |
| 5,097,349 | 3/1992 | Nomura et al. . |
| 5,751,892 | 5/1998 | Hirayama et al. .................. 386/125 |

FOREIGN PATENT DOCUMENTS

| | | |
|---|---|---|
| 459157 | 12/1991 | European Pat. Off. . |
| 600511 | 6/1994 | European Pat. Off. . |
| 0750304 | 12/1996 | European Pat. Off. . |
| 63-50184 | 3/1988 | Japan . |
| 63-225926 | 9/1988 | Japan . |
| 4119444 | 4/1992 | Japan . |
| 5234248 | 9/1993 | Japan . |
| 676479 | 3/1994 | Japan . |
| 779399 | 3/1995 | Japan . |
| 7147661 | 6/1995 | Japan . |
| 7334939 | 12/1995 | Japan . |

*Primary Examiner*—Thai Tran
*Attorney, Agent, or Firm*—Price Gess & Ubell

[57] ABSTRACT

A multimedia disc made up of a video data storage region and a management information storage region, the video data storage region storing a plurality of video data sequences, each video data sequence having a plurality of video segments of a reproduction period which are recorded in an interleaved manner with a plurality of audio samples, wherein a plurality of sub-pictures and a plurality of control procedures and one audio sample and one sub-picture are reproduced simultaneously with a video segment and wherein each control procedure indicates one video data sequence as a branch address which reflects an interactive operation of a reproduction device during reproduction of a current video data sequence, the management information storage region storing management information comprised of group information which shows which video data sequences have been grouped together to compose a group for which only one of the composing video data sequences is reproduced, a plurality of level identifiers, each of which is assigned exclusively to only one video data sequence in a same group and branch information which indicates, for an arbitrary video data sequence, a video data sequence to be reproduced after termination of reproduction of the arbitrary video data sequence.

8 Claims, 22 Drawing Sheets

Fig. 7

| PROGRAM CHAIN ATTRIBUTES | BLOCK TYPE | BLOCK MODE | LEVEL ID |
|---|---|---|---|
| #1 | NO PARENTAL BLOCK | NULL | NULL OR 3 |
| #2 | PARENTAL BLOCK | START | 1("18") |
| #3 | PARENTAL BLOCK | MIDDLE | 2("15") |
| #4 | PARENTAL BLOCK | END | 3("GENERAL") |
| #5 | PARENTAL BLOCK | START | 2("15") |
| #6 | PARENTAL BLOCK | END | 3("GENERAL") |
| #7 | NO PARENTAL BLOCK | NULL | NULL OR 3 |

Fig. 12

| OPERATION CODE | OPERAND | OUT LINE |
|---|---|---|
| Link | PROGRAM CHAIN NUMBER OF BRANCH ADDRESS | BRANCH TO INDICATED PROGRAM CHAIN |
| CmpReg Link | REGISTER NUMBER, INTEGER VALUE, BRANCH CONDITIONS, PGC NUMBER OF BRANCH ADDRESS | VALUE COMPARED TO REGISTER, BRANCH PERFORMED IF BRANCH CONDITIONS SATISFIED |
| SetReg Link | REGISTER NUMBER, INTEGER VALUE, OPERATION, PGC NUMBER OF BRANCH ADDRESS | OPERATION USING VALUE AND REGISTER, BRANCH |
| SetReg | REGISTER NUMBER, INTEGER VALUE, OPERATION (SUBSTITUTION, ADDITION SUBTRACTION ETC) | OPERATION(SUBSTITUTION, ADDITION SUBTRACTION ETC)USING VALUE TO UPDATE REGISTER |
| Random | REGISTER NUMBER, INTEGER VALUE | RANDOM NUMBER GENERATED |
| SetTime | TIMER VALUE | TIMER VALUE SET |

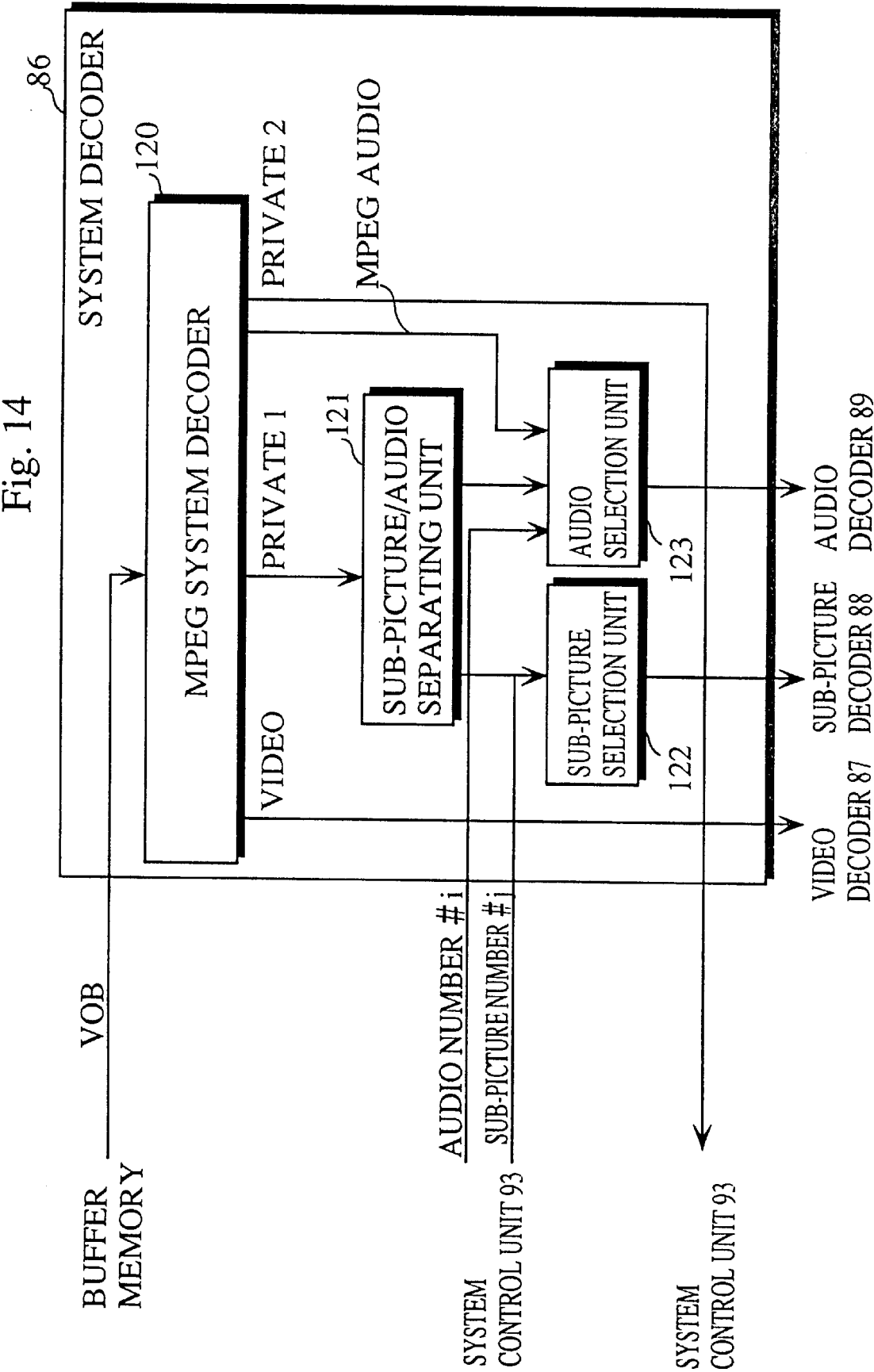

MULTIMEDIA OPTICAL DISC FACILITATING BRANCH REPRODUCTION TO PARENTAL LOCK SECTIONS USING REDUCED CONTROL INFORMATION AND A REPRODUCING DEVICE FOR SAID DISC

BACKGROUND OF THE INVENTION

1. Field of the Invention

The present invention relates to a multimedia optical disc which stores multimedia data including digital video data, audio data and sub-picture data as well as to a reproducing device for the disc. More specifically, the invention is a technique for the easy realization of branch reproduction to parental lock sections using reduced control information.

2. Description of the Related Art

In recent years there has been an increase in the use of optical discs, such as laser discs and video CDs, as optical storage media for recording multimedia data made up of video, audio and other such data.

Of these, video CDs have achieved a storage capacity of around 600 MB (megabytes) for a medium which was originally used for digital audio, with the storage of video data having been achieved due to the development of a high-compression video data compression method called MPEG (Moving Pictures Experts Group). In this way, movie titles which were stored on laser discs can now be stored on video CDs.

As the result of recent research and development, DVDs (digital video discs) which achieve a dramatic increase in storage capacity have been developed. Such DVDs have a storage capacity of around 4.7 GB (gigabytes), so that video whose image quality is vastly superior to video CDs (whereby an increased amount of data is used per unit reproduction time) can be stored and the maximum reproduction time can be increased to allow the recording of long titles. More precisely, the reproduction time of 74 minutes which is possible with a video CD can be increased to over two hours for a DVD. For these reasons, DVDs allow the storage of movies which, due to their long reproduction time, cannot be recorded on video CDs, with the long reproduction time and high picture quality making DVDs ideal for such storage.

Regarding movie titles, it is quite common for several different versions of a same movie to exist, such versions differing from each other in content. As examples, there can be an adult version and a general viewing version, a cut version and a no-cut version, or a cinema version and a television broadcast version.

The following is an explanation of a first conventional reproduction system for reproducing a specified version out of a plurality of different versions of a same movie which are efficiently stored on an optical disc.

This reproduction system includes a registering unit, a selecting unit and a reading unit and is a system which selects and reproduces one out of two or more versions of a same film stored on a software carrier.

The software carrier referred to here has the video data blocks of the following three types stored on a same track.

1. Blocks including video data unique to one of the two or more versions.
2. Blocks including video data unique to another of the two or more versions.
3. Blocks including video data which is common to two or more versions.

For this kind of reproduction system, the registering unit registers which of the versions is to be reproduced. The selecting unit selects the common blocks and only the blocks which are unique to the selected version. The reading unit reads the video data for the selected blocks from the software carrier and generates a reproduction signal, with the video data in the same track which is unique to a version which is not being played being excluded.

FIG. 1 shows the aspects of reproduction of a plurality of video data blocks by such a conventional reproduction system. In this drawing, optional block A is video data unique to version A (such as an adult version), optional block B is video data unique to version B (such as a general viewing version) and common blocks 1 and 2 are video data which is common to both versions.

In the present example, the blocks described above are recorded on a software carrier and "version B" is registered in the registering unit of the reproduction system. In this case, common block 1, optional block B and common block 2 are selected in that order by the selecting unit and the video data in common block 1, optional block B and common block 2 is read by the reading unit.

By means of this kind of conventional system, for an example when an adult and a general viewing version of a same movie title are recorded on a software carrier, the continuous reproduction of only the general viewing version or only the adult version can be achieved. By doing so, a parental lock can be achieved whereby parents can ensure that the reproduction of a general viewing version, which does not include scenes featuring sex or violence that are unsuitable for minors, is performed.

Here, while the conventional system described above can achieve the continuous reproduction of one version, it is totally unsuited to the reproduction of interactive applications where interaction between the user and the system is possible.

Interactive movies, which have been paid a lot of attention in recent years, provide one example of such an interactive application. Here, "interactive movies" refers to movies where the story develops in accordance with selections made by the viewers. As one example, there can be completely different developments in the story depending on a choice made by the viewers at a given scene, such as the story developing so that the leading character goes from country A to country B via a third country, or alternatively, the story developing so that the leading character goes straight from country A to country B.

FIG. 2 is a drawing for showing an example of the reproduction paths which are necessary for an interactive application. As one example, the four blocks in this drawing show the versions A and B for a story wherein the leading character goes from country A to country B via a third country.

For these two versions, the decision of whether or not the leading character visits the third country before visiting country B is made according to a viewer selection. In order for the story to develop so that the leading character can go straight to country B, it is necessary to introduce a shortcut, as shown by the dotted line in FIG. 2, to skip the scenes where the character visits the third country. By making such a shortcut, the reproduction can be such that the scene where the leading character arrives in country B can be shown after the reproduction has followed the story in common block 1 up to the departure from country A. For a conventional reproduction system, the realization of this kind of interactive branch reproduction to a parental lock section has been extremely problematic.

In order to achieve the above reproduction using the stated conventional technique, it would be necessary to use a plurality of branch instructions as described below as the reproduction control information. One of these branch instructions informs the reproduction system of a branch to the reproduction position for the scene depicting arrival in country B in unique block A when version A is being reproduced while another of these branch instruction informs the reproduction device of a branch to the reproduction position for the scene depicting arrival in country B in unique block B when version B is being reproduced. This is to say, a same number of branch instructions as there are unique blocks (versions) become necessary just to realize one shortcut.

In general, for an interactive movie, the greater the amount of story branches, the greater the viewer's sense of wonder at the variety of story developments. In order to achieve this, it is necessary to have branch instructions for each of the different story developments from the branching points of the story. Since these branch instructions need to be stored in the memory of the reproduction system before the reproduction of the video data in the block, the memory capacity of such reproduction system needs to be greater, the more such branch instructions are present.

In particular, when there are a plurality of such branching points in the video data, it becomes necessary to store an extremely large number of branch instructions in the memory. For the previous example of a shortcut from country A to country B, suppose that there are ten different branching points provided for common block A, which can represent an opportunity for the character to travel by car, an opportunity for the character to travel by airplane, an opportunity for the character to travel by train and the like. In this situation, it becomes necessary to store all of the branch instructions which can be executed at these opportunities in the memory of the reproduction device.

The problem of this increase in the necessary memory size of the reproduction device becomes especially severe for interactive applications which include parental lock sections as described above. This is because when a branch is performed to a parental lock section, separate branch instructions are necessary for each of the levels in the parental lock section. As one example, if it is supposed that at one reproduction position of an interactive movie there are N possible branches which each represent a different development in the story and, for each branch address, separate blocks on M different levels (versions) for viewing control of the sex scenes or violent scenes present in the video data, a total of N*M branch instructions would need to be set for this reproduction position. Furthermore, if there are L branching points in a video data block, a total of N*M*L branch instructions need to be stored beforehand in the memory in order to reproduce this video data block. Accordingly, a memory of substantial storage capacity becomes necessary for the reproduction device.

Here, it is desirable to restrict the memory capacity of the reproduction device to a minimum. This is because by doing so, the reproduction device can be supplied at a lower price to the consumer. This is also true for other consumer AV equipment such as video CDs and laser discs where the memory capacity is suppressed to a minimum in order for makers to provide the equipment at an affordable price. As a result, the above method which requires a great number of branch instructions to be stored in a memory is not economically viable for such conventional consumer AV equipment.

In this way, for conventional systems it has been very difficult to achieve interactive reproduction control where reproduction control is performed to selectively reproduce parental lock sections when there is heavy use of branch reproduction.

SUMMARY OF THE INVENTION

It is a primary object of the present invention to provide an optical disc on which a plurality of sets of audio data and sub-picture images are interleaved with video data and a reproduction device for such disc for which both reproduction control to selectively reproduce parental lock sections and reproduction control for interactive reproduction can both be easily achieved. In particular, the invention aims to achieve the easy realization of branch reproduction to parental lock sections using reduced control information.

The stated object can be achieved by a multimedia disc comprising: a video data storage region for storing at least one video data sequence, wherein each video data sequence has a plurality of video segments of a reproduction period which are recorded in an interleaved manner with a plurality of audio samples, a plurality of sub-pictures and a plurality of control procedures, wherein one audio sample and one sub-picture are reproduced simultaneously with a video segment, and wherein each control procedure indicates one video data sequence as a branch address which reflects an interactive operation of a reproduction device during reproduction of a current video data sequence; and a management information storage region which stores management information, the management information comprising: group information which shows which video data sequences have been grouped together to compose a group for which only one of the composing video data sequences is reproduced; a plurality of level identifiers, each of which is assigned exclusively to only one video data sequence in a same group; and branch information which indicates, for an arbitrary video data sequence, a video data sequence to be reproduced after termination of reproduction of the arbitrary video data sequence, wherein when a video data sequence which is a branch address belongs to a group, the control information specifies any video data sequence in the appropriate group to the reproduction device as a branch address.

By means of the multimedia optical disk of the construction described above, group information and level identifiers clearly show the correspondence between the various video data sequences in a group and their level identifiers. This is to say, the group information and level identifiers enable the reproduction device to selectively reproduce only one out of the video data sequences in a group.

Additionally, there is only one branch address shown by each control procedure, so that even when a video data sequence which is the branch address belongs to a group, it is sufficient to set any video data sequence in the group as the branch address. Accordingly, when the branch address is a video data sequence which belongs to a group, it is unnecessary to separately indicate each of the plurality of branch addresses in accordance with their level identifiers. For the example of a shortcut in an interactive movie, branch reproduction to a video data sequence in a group can be achieved using a minimal amount of data.

For the reasons given above, selective reproduction control for video data sequences which are grouped together (such as parental lock sections or sections where there are a plurality of versions) and interactive reproduction control can both be easily achieved.

Also, each video data sequence may be made up of a plurality of objects, each of the objects including at least one control procedure, and wherein chains, each which indicates a combination of objects which forms one of the video data sequences, may be stored in the management information storage region.

By means of the above construction, reproduction branches from any object in a video data sequence can be easily achieved. In addition, since each video data sequence is a combination of a plurality of objects, video data sequences for a plurality of versions where only some of the objects are different can be efficiently stored on the disc.

Also, each control procedure may include a jump indication which has one of the video data sequences as a branch address, the jump indication being a branch command to be executed by the reproduction device, wherein each branch command is one of a command which has a branch address chain as an operand and a conditional command which indicates a branch to a branch address chain given as an operand only when a specified condition is satisfied.

By means of the above construction, branch instructions and conditional branch instructions can be used according to necessity, which means that in addition to interactive movies, game applications and catalog applications can be easily realized.

Also, the video data storage region may be made up of a plurality of object storage regions, each of the object storage regions being recorded in consecutive sectors of the multimedia disc.

By means of the above construction, linear retrieval becomes possible for the reproduction device when reproducing objects.

Also, each of the objects may be made up of a plurality of object units, each of the object units being made up of one video segment, one control procedure and at least one of an audio sample and a sub-picture, wherein a control procedure for an object unit which is presently being reproduced supplies the reproduction device with information which is necessary for interactive operation, and wherein the plurality of object units are arranged in order of reproduction in the object storage regions.

By means of the above construction, reproduction branches can be performed from any of the object units. As one example, if each object unit is set as containing a video segment with a reproduction time of 0.5 seconds, interactive reproduction control can be performed for very small time units.

Also, each control procedure may be recorded in a different sector of the multimedia disc.

By means of the above construction, the size of the control procedures is equal to the smallest unit (sector) for retrieval by the reproduction device from the optical disc, which means that the capacity of the buffer in the reproduction device which is used -to store the control procedure can be minimized.

Also, each of the object units may further include at least one sub-picture, wherein each of the sub-pictures includes a plurality of item images which are displayed having been superimposed on a video segment, and wherein each control procedure includes a plurality of jump commands, each of the jump commands corresponding to one of the item images and each of the jump commands indicating a different branch address.

By means of the above construction, interactive control is possible whereby reproduction branches to different branch addresses for each item image displayed by the reproduction device can be performed.

Also, the multimedia disc may further include a track which has the sectors arranged in a spiral, wherein the management information storage region may be assigned a plurality of the sectors which are read by the reproduction device before the video data storage region is read.

By means of the above construction, it becomes possible for the reproduction device to retrieve the video data storage region with a minimal head seek operation after the retrieval of the management information storage region.

The stated object can be achieved by a reproduction device for a multimedia optical disc which includes a video data storage region and a management information storage region, wherein the video data storage region stores a plurality of video data sequences, each of the video data sequences having a plurality of video segments of a reproduction period which are recorded in an interleaved manner with a plurality of audio samples, a plurality of sub-pictures and a plurality of control procedures, wherein one audio sample and one sub-picture are reproduced simultaneously with a video segment, and wherein each control procedure indicates one video data sequence as a branch address which reflects an interactive operation of a reproduction device during reproduction of a current video data sequence, while the management information storage region which stores management information which comprises group information which shows which video data sequences have been grouped together to compose a group for which only one of the composing video data sequences is reproduced, a plurality of level identifiers, each of which is assigned exclusively to only one video data sequence in a same group and branch information which indicates, for an arbitrary video data sequence, a video data sequence to be reproduced after termination of reproduction of the arbitrary video data sequence, wherein the reproduction device comprises: a retrieving unit for retrieving data and control information from the optical disc; a retrieval controlling unit for controlling retrieval of video data sequences and management information; a reproducing unit for reproducing the video segment, the audio sample and the sub-pictures in the video data sequence read by the retrieving unit; a level registering unit for registering level information which is set beforehand by a user; an interactive operation receiving unit for receiving an indication operation which is interactive with images which are currently being reproduced; a branch address temporary determining unit for temporarily determining a video data sequence which is a branch address by referring to a video data sequence which is being reproduced, a control procedure and a next data indication in accordance with a content of an indication received by the interactive operation receiving unit; a branch address actual setting unit for referring to the management information, for determining whether there is any other video data sequence which can be reproduced as an alternative to the temporarily determined video data sequence, for actually setting, when there is no alternative video data sequence, the temporarily determined video data sequence as a branch address video data sequence and for actually setting, when there is no alternative video data sequence, a video data sequence with a level identifier which matches the level information registered in the level registering unit as a branch address video data sequence, out of all video data sequences in a same group as the temporarily determined video data sequence; and an indicating unit for indicating to the retrieval controlling unit to retrieve the video data sequence actually set by the branch address actual setting unit.

By means of the above construction, only one video data sequence is temporarily determined as a branch address by the branch address temporary determining unit in accordance with the indication received by the interactive operation receiving unit. When the temporarily determined video data sequence does not belong to a group, this temporarily determined video data sequence is actually set as the branch address. However, when the temporarily determined video data sequence belongs to a group, the branch address actual setting unit actually sets a video data sequence with a level identifier which matches the level information registered in the level registering unit as a branch address video data sequence, out of all of the video data sequences in the group in question. The video data sequence which is actually set in this way is then retrieved by the retrieving unit according to control by the retrieval controlling unit and the indicating unit and its reproduction is commenced. By doing so, when a video data sequence which is a branch address belongs to a group, it is no longer necessary to specify each branch address separately for each of a plurality of level identifiers, so that thanks to the control procedure it is sufficient to specify only one video sequence. For the example of a shortcut in an interactive movie, branch reproduction from data being reproduced to a video data sequence which belongs to a group can be achieved using a small amount of control information.

For the reasons given above, selective reproduction control for video data sequences which are grouped together (such as parental lock sections or sections where there are a plurality of versions) and interactive reproduction control can both be easily achieved.

Also, the level registering unit may register a personal identification number together with the level information.

By means of the above construction, a personal identification number can be used to set a lock.

Also, the reproduction device may further comprise an inputting unit for receiving a user input of a personal identification number; a matching determining unit for determining whether a personal identification number matches a personal identification number registered in the registering unit.

By means of the above construction, only users, such as parents, who know a correct personal identification number are able to change the level information registered in the level registering unit.

Also, the branch address actual setting unit may include:

a comparing unit for comparing the level information registered in the registering unit and level identifiers in the management information stored on the optical disc;

a first determining unit for determining, when a comparing result of the comparing unit is that there is a level identifier which matches the level information, a video data sequence which has the matching level identifier; and a second determining unit for determining, when a comparing result of the comparing unit is that there is no level identifier which matches the level information, a video data sequence which has a level identifier which is closest to the level information but which represents a more restricted content of a video data sequence.

By means of the above construction, even when there is no level identifier of a video data sequence in a group which matches the level information registered in the level registering unit, a video data sequence with a most appropriate level identifier can be actually set.

BRIEF DESCRIPTION OF THE DRAWINGS

These and other objects, advantages and features of the invention will become apparent from the following description taken in conjunction with the accompanying drawings which illustrate a specific embodiment of the invention. In the drawings:

FIG. 7 shows a more detailed example of the attribute table shown in FIG. 5;

FIG. 12 shows a specific example of the instructions used as pre-processing commands, post-processing commands and highlight commands;

FIG. 14 is a block diagram showing the construction of the system decoder 86 shown in FIG. 13B;

DESCRIPTION OF THE PREFERRED EMBODIMENT

The present embodiment describes an example where a DVD (digital video disc) which can achieve a storage capacity of 4.7 GB on one side of a 120 mm diameter optical disc is used as a multimedia optical disc.

Physical Construction of the Optical Disc

Figure 1:
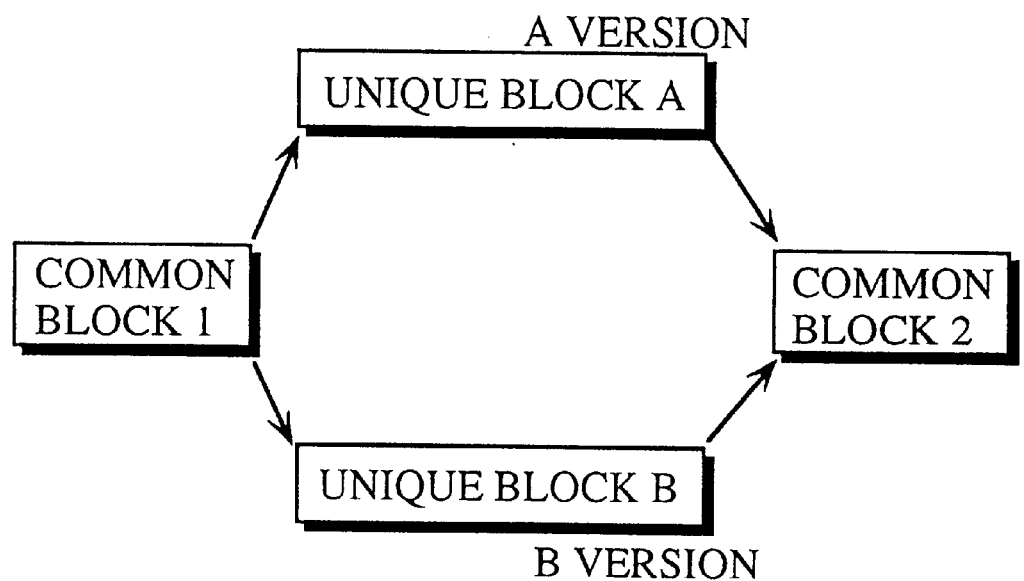
FIG. 1 shows reproduction routes for video data blocks in a plurality of versions for a conventional reproduction system.
Figure 2:
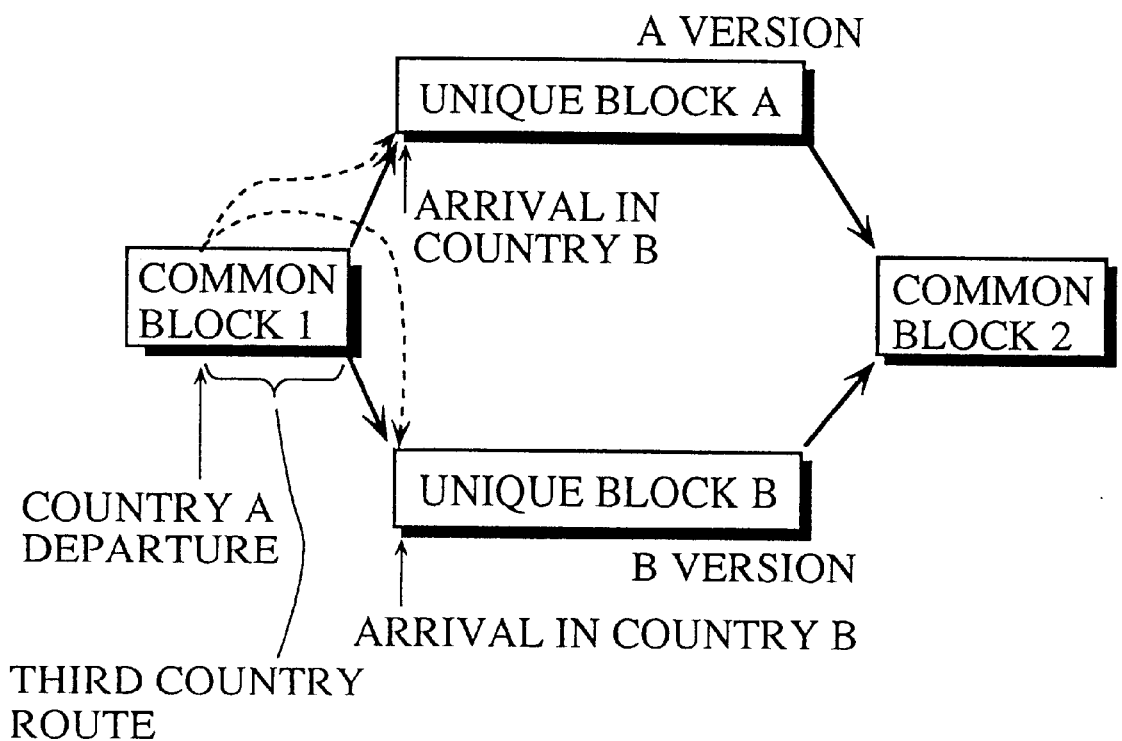
FIG. 2 shows an example of a set of reproduction routes which are required by an interactive application.
Figure 3:
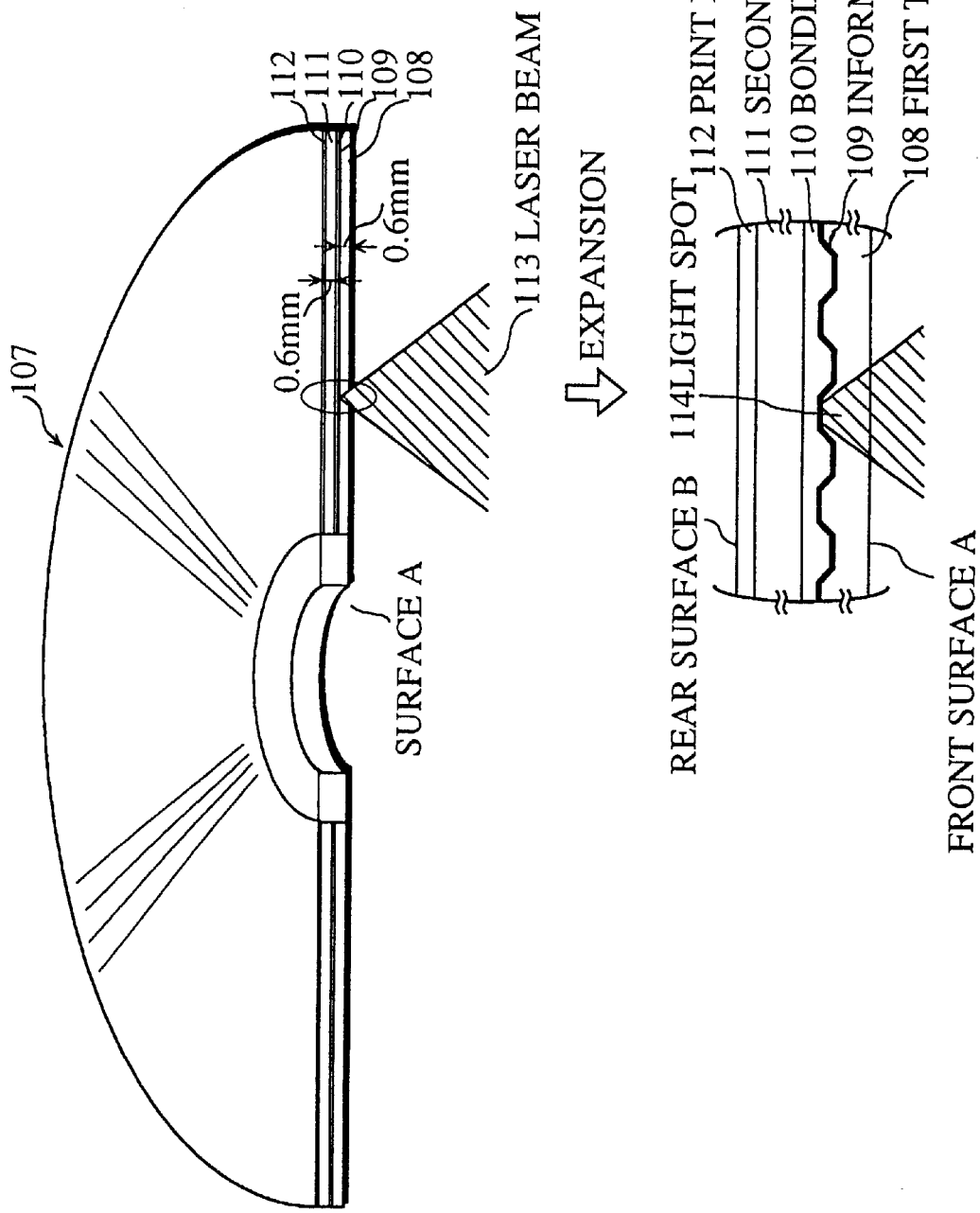
FIG. 3 shows a cross-section of a DVD as used in the embodiment of the present invention.

FIG. 3 shows a cross-section of the DVD. Starting from the bottom, DVD 107 is formed of a first transparent substrate 108 which is around 0.6 mm thick (which is to say between 0.5 mm and 0.7mm), on top of which an information layer 109 made of a reflective membrane such as metal foil is attached, with a bonding layer 110 and then a second transparent substrate 111 being formed on top of the information layer 109. If necessary, a print layer 112, or in other words a printed label, is printed on top of the second transparent substrate 111, with it not being necessary for this print layer 112 to cover the entire disc.

In this drawing, the bottom side of the disc onto which laser beam 113 is shone and from which information is read is set as the front surface A, while the top side of the disc with the print layer 112 is set as the rear surface B. Here, indented and protruding pits are formed in the information layer 109 side of the first transparent substrate 108 by a manufacturing process so that information can be recorded by varying the length of pits and the intervals between them. This is to say, the indentations and protrusions of the pits in the first transparent surface 108 are imprinted into the information layer 109. The lengths of the pits and intervals for this disc are shorter than on a conventional CD, with the pitch of the information tracks in which the pit streams are formed also being narrower, which results in improved surface storage density.

The surface A side of the first transparent substrate 108 in which pits are not formed is flat. The second transparent substrate 111 is a reinforcer and is made of the same thickness (around 0.6 mm) of the same material as the first transparent substrate 108, with both of its surfaces being flat.

Information is retrieved from this kind of disc by shining the laser beam 113 on the disc and measuring changes in the reflection ratio of the light spot 114. The light spot 114 on a DVD has a diameter of around 1/1.6 times the diameter of a light spot on a conventional CD due to an increase in the numerical aperture NA of the objective lens and a reduction in the wavelength $\lambda$ of the laser beam.

DVDs of the physical construction described above can store around 4.7 GB of information on one side, which is almost eight times the storage capacity of a conventional CD. As a result, it is possible to achieve a great improvement in picture quality for moving pictures and to increase the reproduction time from the 74 minutes which is possible with a video CD to over two hours. This high storage capacity makes DVDs very suitable for use as storage media for moving pictures.

The substrate technique which has enabled this improvement in storage capacity is a reduction of the spot diameter D of the laser beam. Here, spot diameter D is given by the equation "D=laser wavelength $\lambda$/numerical aperture of objective lens NA", so that the spot diameter D can be reduced by reducing the laser wavelength $\lambda$ and by increasing the numerical aperture of objective lens NA. It should be noted here that if the numerical aperture of objective lens. NA is increased, comatic aberration occurs due to the relative inclination, known as "tilt", between the optical axis of the beam and the disc surface. In order to suppress this phenomenon, DVDs use a transparent substrate of reduced thickness. Such a reduction in the thickness of the transparent substrate creates the problem of reduced physical durability for the disc, although this problem can be overcome by reinforcing DVDs with another substrate. Here, it is especially desirable to have the two substrates formed of the same thickness of the same material.

Data is read from DVDs using an optical system with a short wavelength (650 nm) red semiconductor laser and an objective lens whose NA (numerical aperture) can be enlarged up to 0.6 mm. If the thickness of the transparent substrate is reduced to around 0.6 mm, a storage capacity of up to 4.7 GB can be achieved for one side of a 120 mm diameter optical disc. With this large storage capacity, there is more than enough capacity for a whole feature film to be recorded on one disc, with it further being possible for the manufacturer to include soundtracks in several different languages. In fact, the storage capacity of 4.7 GB achieved by this substrate technique allows the storage of several sets of video and audio data on a same disc.

Data Composition of the Entire Disc

Figure 4:
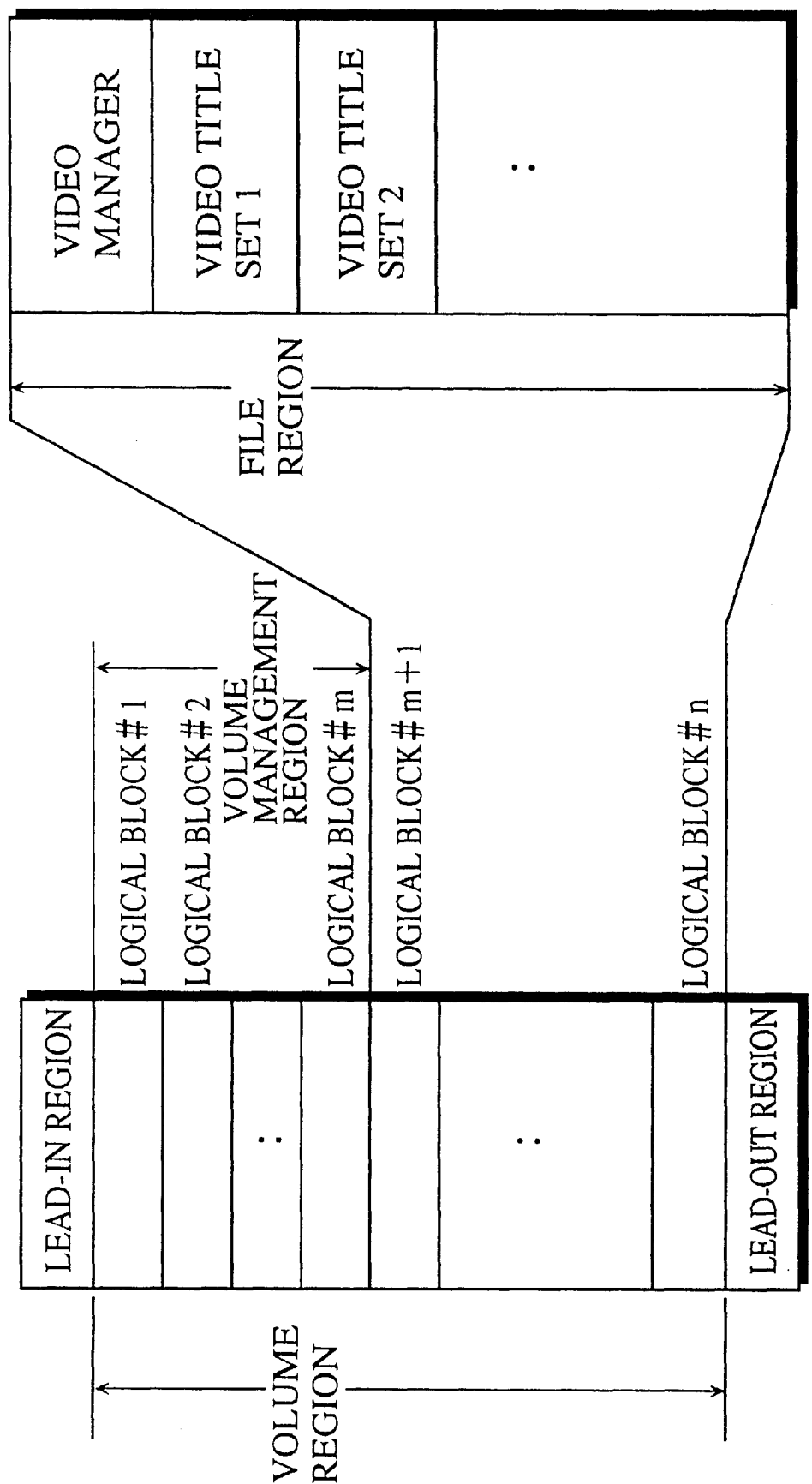
FIG. 4 shows a simplification of the data construction for the entire optical disc.

FIG. 4 shows a simplification of the data construction of the entire optical disc in the present embodiment.

As shown in this drawing, the regions on the optical disc which store data can be broadly classified into a lead-in region, a volume region and a lead-out region. Here, the volume region is further made up of a volume management region and a file region, with this file region being made up of a video manager file (hereinafter abbreviated to "video manager") and a plurality of video title set files (hereinafter abbreviated to "video title sets").

The "lead-in region" is located at the innermost part of the optical disc and stores data to stabilize operation at the start of retrieval by the reproduction device.

The "lead-out region" is located at the outermost part of the optical disc and stores data which shows that the volume region has ended.

The "volume region" is located between the lead-in region and the lead-out region and is made up of an extremely large number of logical blocks (called "sectors") which are physically arranged onto a spiral track as a one-dimensional array. Each logical block is made up of 2 KB (kilobytes) and is distinguished from the others using a block number (sector address). This logical block size is the smallest unit for retrieval by the reproduction device.

The "volume management region" takes up a necessary number of blocks starting from the first block and is used to manage the entire disc. It stores information for the files in the file region according to ISO (International Standards Organization) 13346.

The "video manager" in the file region expresses the management information for the entire disc. This video manager includes information for expressing a volume menu which is a menu for setting/changing the reproduction control for the entire volume.

The "video title set" has a size which is an integer multiple of logical blocks or, in other words, 2048 bytes*n, and stores a plurality of video objects (hereinafter abbreviated to VOB) and information for reproduction control of VOB. Here, the title set when three versions of a same movie title, these being a no-cut version, a cinema version and a television version, are recorded on a DVD are the names of these three versions. Since VOBs can be common to these different versions of the title, both common VOBs and VOBs unique to only one version are recorded in this video title set file. The size of one VOB can be set by the software developer to be one scene in a movie, a whole movie, or one song for karaoke.

Data Construction of Video Title Set

Figure 5:
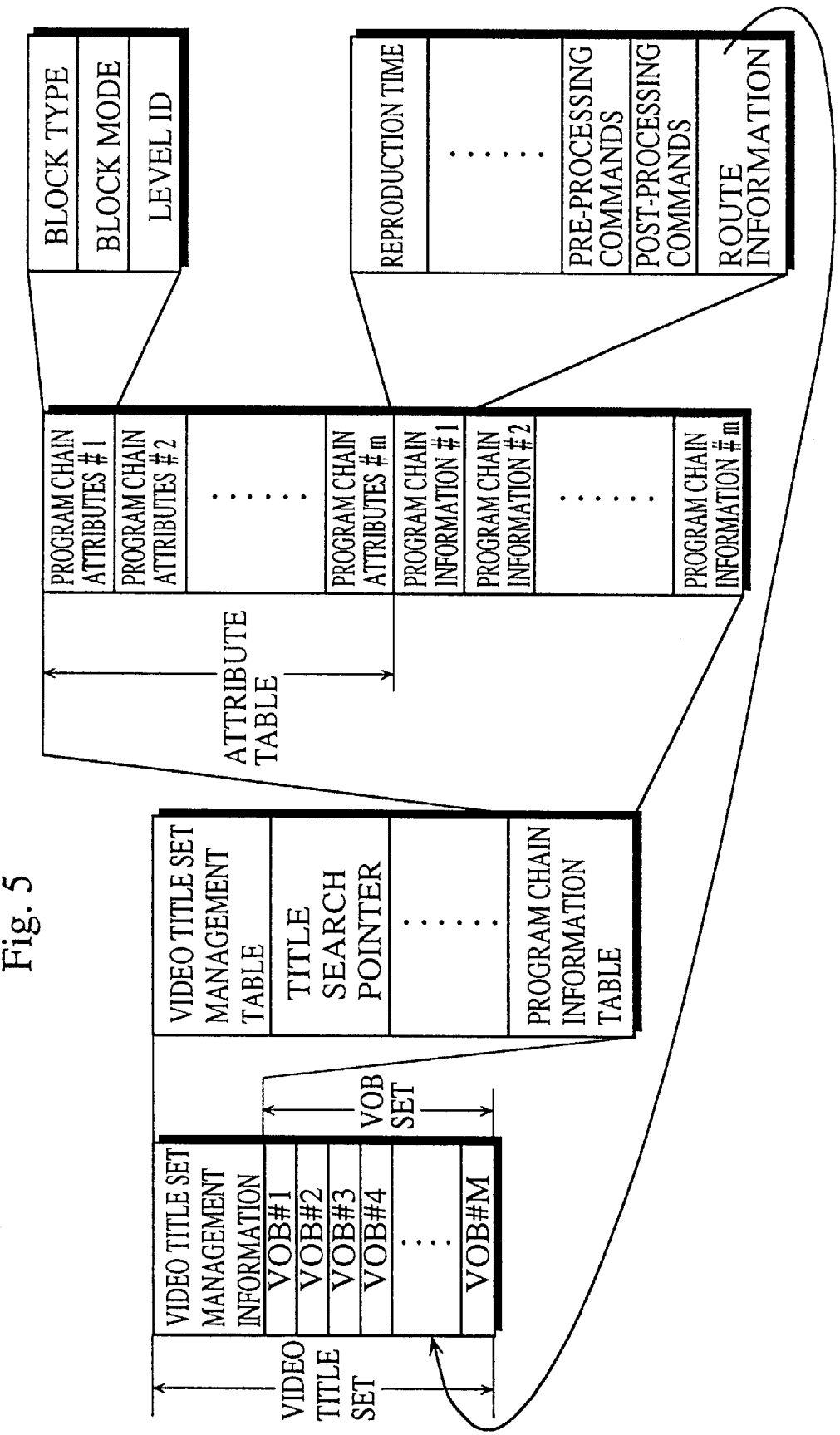
FIG. 5 shows the internal construction of the video title set shown in FIG. 4.

FIG. 5 shows the internal construction of the video title set file in FIG. 4. As shown in this drawing, the video title set is made up of video title set management information and a VOB set.

The VOB set is made up of a plurality of VOBs. Each VOB is constructed so as to include a plurality of audio data, a plurality of sub-picture data and management information which are interleaved together with video data.

The "video title set management information" includes a video title set management table, title search pointer management information, a program chain information table and the like.

The "video title set management table" shows the internal construction, which is to say the contents (such as the kind of information stored or whether there is a table) of the video title set management information.

The "program chain information table" is a table which stores a plurality of entries of program chain information and a plurality of program chain attributes (these attributes being collectively referred to hereinafter as the attribute table) which correspond to each entry of program chain information. In FIG. 5, program chain information #1–#m are written in along with the program chain attributes #1–#m so as to one-to-one correspond with each other. Here, program chain information includes the information given by one program chain, which is to say route information showing a reproduction order of a plurality of VOBs as well as control information relating to the reproduction. In this embodiment, a program chain (hereinafter, PGC) is a list of VOBs which is decided by the reproduction order described above. Here, by setting the route information, the software title developer can freely combine any number of VOBs in their desired order as a PGC. Program attributes, meanwhile, include information such as whether a parental lock level (rating) has been set and, if so, what the set level is.

The "title search pointer management information" shows the plurality of PGCs included in a present video title set and the video title to which this belongs.

The following is a detailed explanation of the PGC information and the PGC attributes.

Each entry of program chain information stores reproduction time, pause reproduction, pre-processing commands, post-processing commands and route information.

"Reproduction time" stores the reproduction time of the program chain.

"Pause reproduction information" indicates a pause during VOB reproduction.

"Pre-processing commands" are the control commands to be executed before the start of reproduction of a program chain.

"Post-processing commands" include branch instructions (LINK instructions) or conditional branch instructions which inform the reproduction device of a next program chain to be reproduced. Pre-processing commands and post-processing commands are described later in this specification.

"Route information", as shown by the arrow in FIG. 5, expresses the reproduction order of the VOBs which compose the program chain in question and is made up of a list of pointers for indicating the logical address of the storage position on the optical disc of each VOB. A list of these pointers is given in reproduction order of each of the VOBs which form the PGC. As one example, the route information for PGC information #1 is made up of pointers which show each of VOBs #1 through #3, while the route information for PGC information entry #2 can be made up of pointers which show each of VOBs #4 through #6, thereby indicating a selected reproduction order of VOBs. This is to say, by using PGC information #1, first VOB#1 is reproduced, with this being followed by VOB#2 and finally VOB#3. Similarly, by using PGC information #2, first VOB#4 is reproduced, with this being followed by VOB#5 and finally VOB#6.

Figure 6:
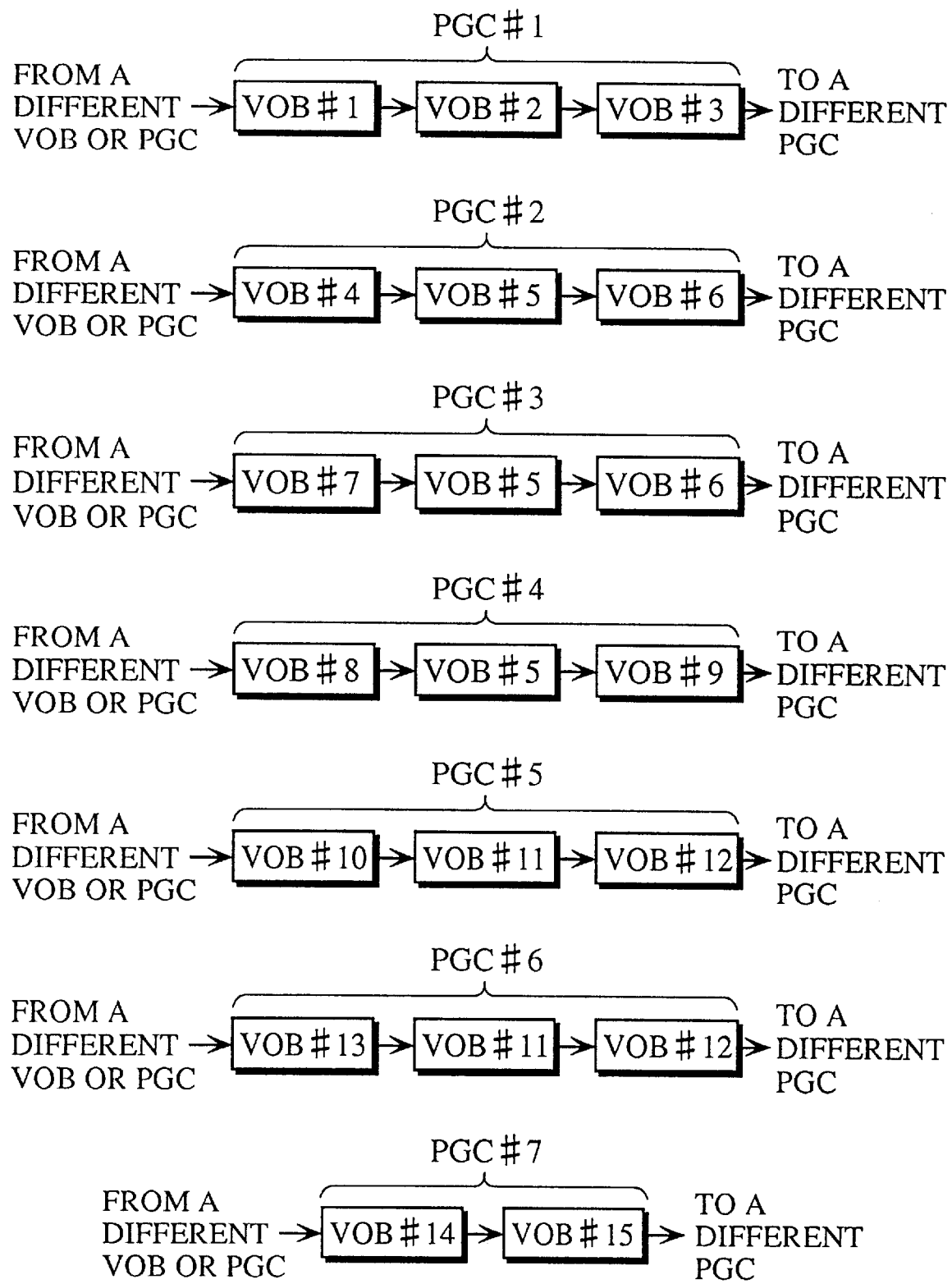
FIG. 6 shows the relation between VOBs and PGCs indicated by the route information.

FIG. 6 shows the relationship between PGCs and VOBs. In this drawing, PGC #1 is made up of three VOB#1–#3. In this case, the route information of PGC information #1 indicates the logical addresses of the storage positions on the optical disc of VOB#1–#3. In the same way, PGC#2–PGC#7 are made up of VOB as described below.

PGC#2=VOB#4, #5, #6

PGC#3=VOB#7, #5, #6

PGC#4=VOB#8, #5, #9

PGC#5=VOB#10, #11, #12

PGC#6=VOB#13, #11, #12

PGC#7=VOB#14, #15

Here, reproduction of each PGC is begun on the completion of reproduction of another PGC (when indicated by a post-processing command) or when there has been a branch during the reproduction of a VOB in a different PGC.

Also, for the example shown in FIG. 6, VOB#5 is commonly used by each of PGC#2–#4, VOB#6 is commonly used by each of PGC#2 and PGC#3 and VOB#11 and #12 are commonly used by each of PGC#6 and PGC#5. The common use of these VOB is due to the selective reproduction of one of PGC#2 and PGC#3 as different versions of a same movie, with VOB#4 and VOB#7 being unique to each version and VOB#5 and VOB#6 being common to each version.

The following is a description of the details of the PGC attribute table.

FIG. 7 shows a detailed example of the attribute table shown in FIG. 5. Here, each entry of the PGC information table (attribute table) is composed of a block type, a block mode and a level ID.

"Block type" shows whether the PGC corresponding to the PGC attribute has been converted into a block. As a specific example, PGC#2, #3 and #4 are parts of a same film which have different rating levels (or which belong to different versions) and which are reproduced selectively. As one example, PGC#2 can be the version for 18 year-olds and over (hereinafter referred to as level 1), PGC#3 can be the version for 15 year-olds and over (hereinafter referred to as level 2) and PGC#4 can be the version for general viewing (hereinafter referred to as level 3), with only one of these being selected and reproduced. These PGC #2–#4 are called a block. For the above case, PGC information #2–#4 are stored consecutively in the PGC information table, while PGC attributes #2–#4 are stored consecutively in the PGC information table (in the attribute table). These PGC attributes #2, #3 and #4 have "block" set as their block types, while the PGCs which have not been block converted having their block type set as "non-block". "Block mode" is set as "null" when the PGC corresponding to PGC attributes has not been block converted ("non-block"), while, when the PGC has been block converted, it indicates the storage position in the block of the PGC attributes in the PGC information table, this storage position being one of the start, middle or end of the block. As a specific example, since the PGC attributes #2–#4 are stored consecutively in the PGC information table the respective block modes are set as start, middle and end. Here, if the PGC information which composes one block is recorded consecutively in the PGC information table, the order in which it is saved is not important. This is also the case for PGC attributes.

"Level ID" shows the parental lock level or the version type of the PGC corresponding to the PGC attributes. For the example given above, PGC attributes #2–#4 are set level 1, level 2 and level 3 as their respective levels.

Figure 8:
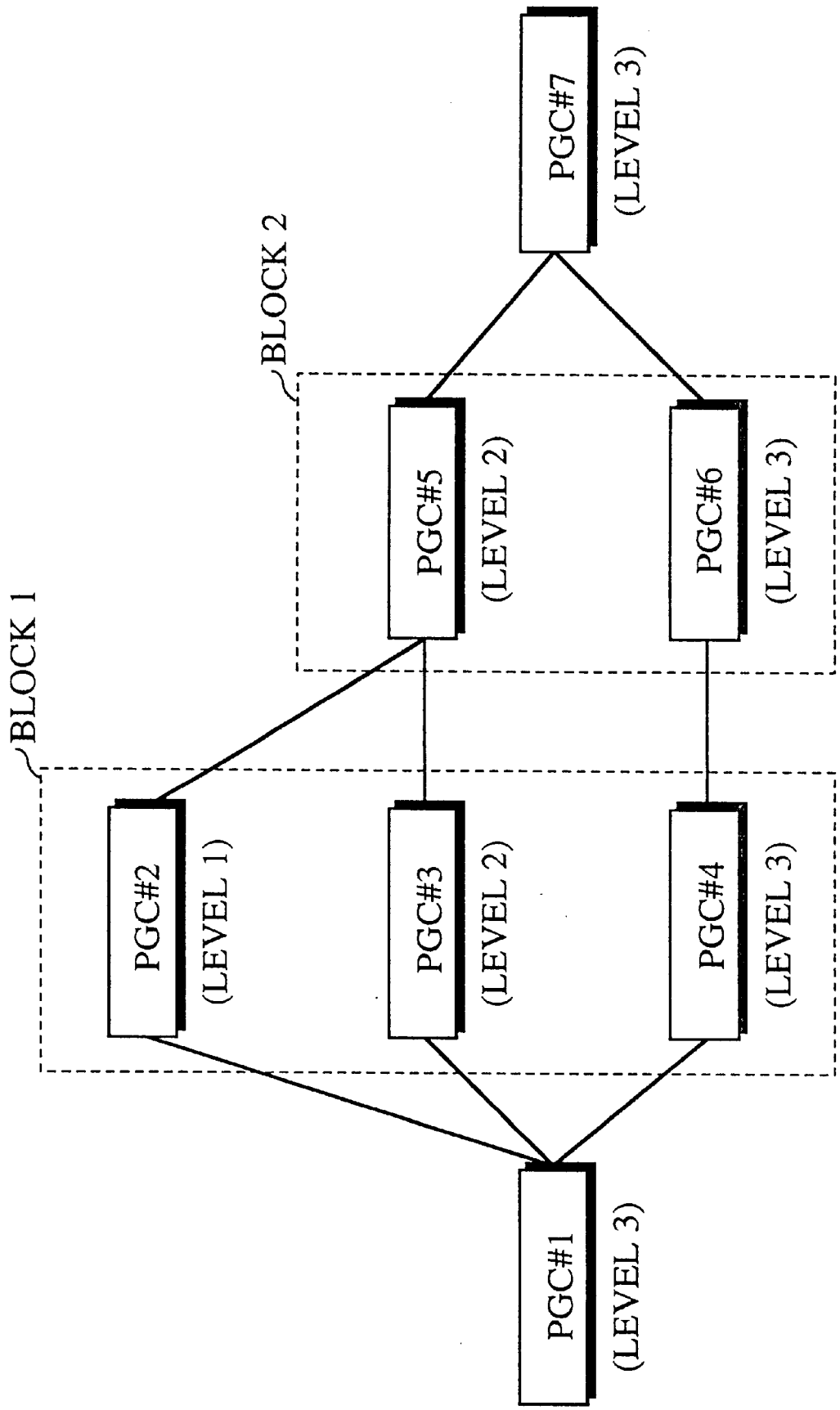
FIG. 8 shows how the three movie versions shown in FIG. 7 are composed of PGCs.

For the example attribute table shown in FIG. 7, there are PGC#1–#7 shown in FIG. 6 which form three versions of a same movie which have the respective levels; level 1, level 2 and level 3. Here, FIG. 8 shows how these three versions of the movie are composed of these PGCs, with their reproduction orders being as shown below.

level 1 version: PGC#1→PGC#2→PGC#5→PGC#7
level 2 version: PGC#1→PGC#3→PGC#5→PGC#7
level 3 version: PGC#1→PGC#4→PGC#6→PGC#7

For the example above, PGC#2, PGC#3 and PGC#4 are treated so that only one of them is selected and reproduced in accordance with the chosen level. PGC#5 and PGC#6 are also treated so that only one of them is selected and reproduced in accordance with the chosen level. PGC#1 and PGC#7, meanwhile, are treated as non-blocks and so are reproduced regardless of the chosen level. For this situation, the block type, block mode and level ID are set in the attribute table as shown in FIG. 7. The PGC attributes #2–#4 are stored as consecutive entries since they form one block, with PGC attributes #5–#6 also being stored as consecutive entries since they, too, form one block. This attribute table is referred to by the reproduction device when there is branch reproduction, so that a branch indication for a PGC in the block becomes extremely simple. As an example, a branch from PGC#1 to any of PGC#2, PGC#3, PGC#4 can be made by setting the branch instruction "LINK PGC#2" as a post-processing command of PGC#1, so that it is unnecessary to set a plurality of branch indications in accordance with the reproduction levels.

Video Objects (VOBs) recorded on a DVD

Figure 9:
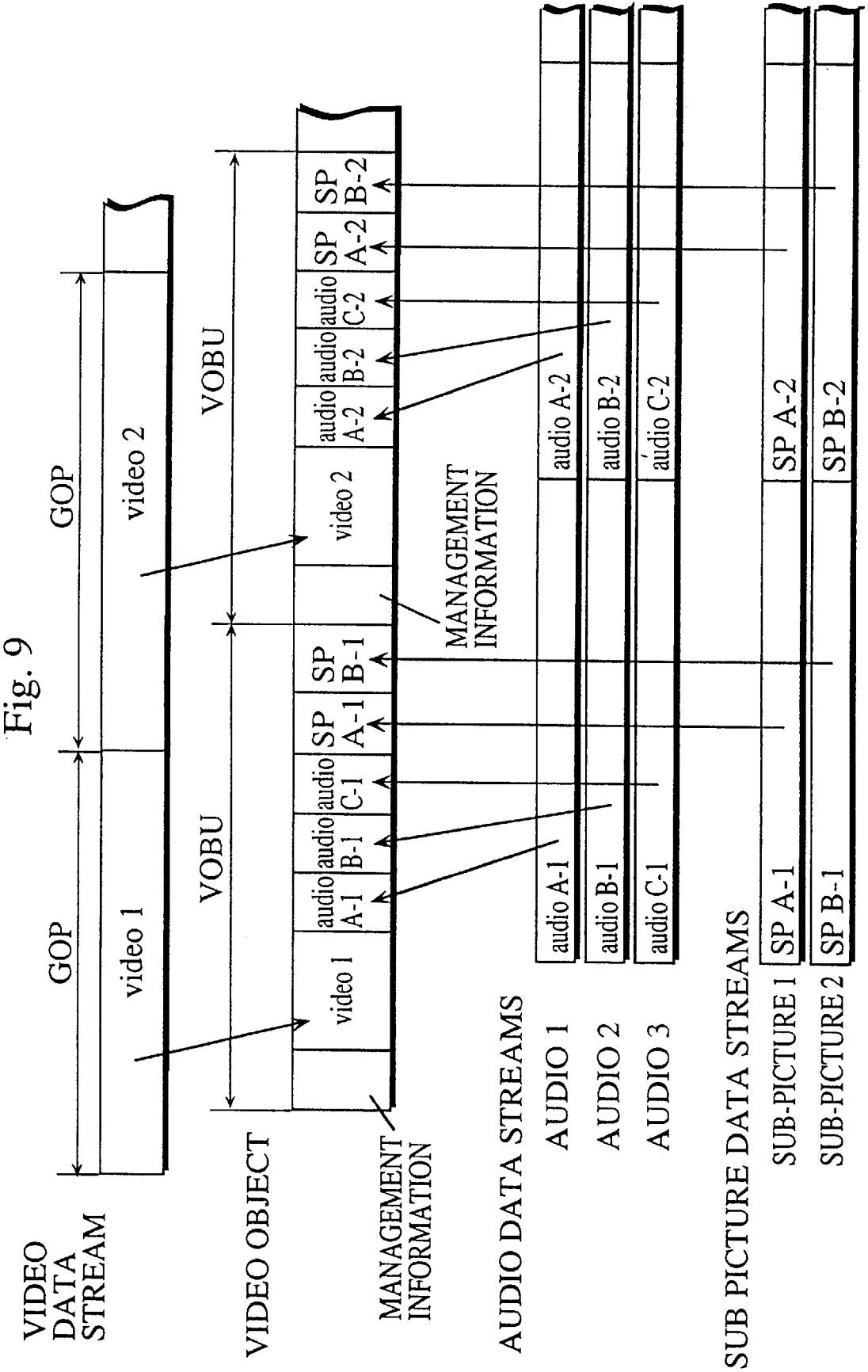
FIG. 9 shows how the composite data stream called a VOB is made up of compressed video data and compressed audio data.

FIG. 9 shows how compressed video data and compressed audio data compose the combined data stream called a VOB. This drawing shows the original video data stream, audio data stream and sub-picture data stream together with the VOB. This illustrated example conforms to the compression method and data format stipulated under MPEG2 (Moving Pictures Experts Group, ISO13818).

In this example, "video data stream" is a serial video data stream which has been compressed and divided into sections called GOPs (Groups of Pictures), with these being expressed as "video 1, video 2, video 3 . . . " in the drawing. This GOP is the unit for decompression of the compressed data, includes about 12–15 frames of video data which equates to a reproduction time of around 0.5–1.0 seconds and is made up of a plurality of video packs which are converted into packs at 2 KB intervals.

Similarly, "audio data stream" is composed of a compressed audio signal which includes left and right channel components of stereo sound and a "surround" component, with three kinds of audio A, B and C being expressed as "audio A-1, audio A-2 . . . ", "audio B-1, audio B-2 . . . " and "audio C-1, audio C-2 . . . " in the FIG. 9. Here, audio A-1, audio A-2 etc. are each made up of one or more audio packs which are converted into packs using 2 KB units.

"Sub-picture data stream" is a data stream which includes compressed graphics, with there being two kinds of sub-picture which are expressed as "SP A-1, SP A-2 . . . " and "SP B-1, SP B-2 . . . " in FIG. 9. Here, SP A-1, SP A-2 etc. are each made up of one or more sub-picture packs which are converted into packs using 2 KB units.

Each of the video data stream, the audio data stream and the sub-picture data stream are interleaved together in the VOB. The cycle used for this interleaving is indicated by the GOP unit in the drawing.

It should also be noted that in the present embodiment management information is interleaved into the VOB. The smallest unit in the VOB which includes management information and the other information is hereinafter called a VOB unit (hereinafter, VOBU). Here, information for achieving interactive reproduction, and especially enabling a variety of branch reproductions, is written in this management information. Here, the reason these packs are given a size of 2 KB is that it coincides with the smallest retrieval unit for the reproduction device, which is to say the same size as the logical blocks (sectors) shown in FIG. 4. Also, the pack management information is distributed so that each VOBU contains one set (pack) of pack management information. This means that a reproduction device with a small memory capacity can still easily achieve interactive reproduction.

Figure 10:
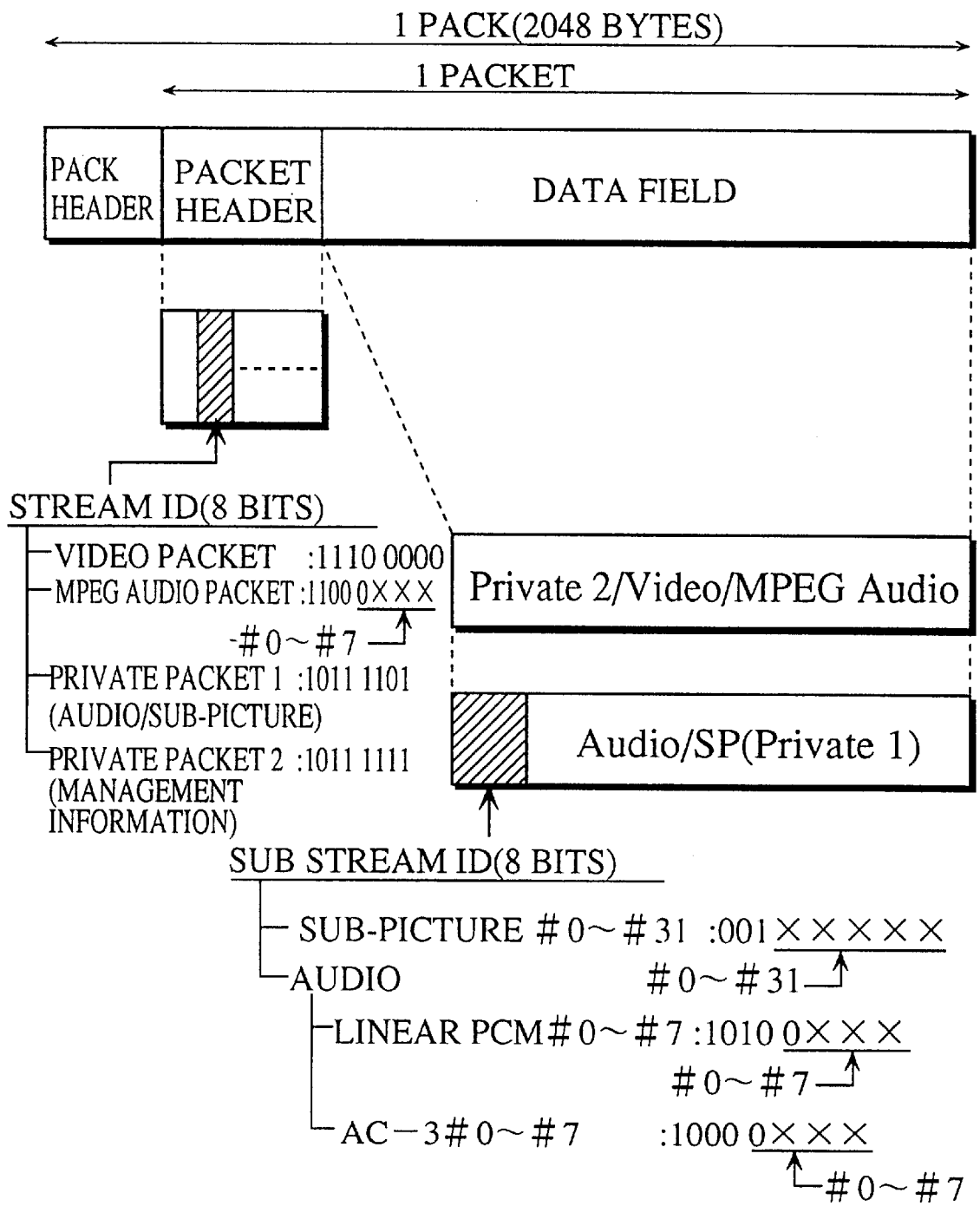
FIG. 10 shows the data formats of each of the video data, audio data, sub-picture data and management pack data which are interleaved in a VOB.

FIG. 10 shows the data format of each of the video data, audio data, sub-picture data and management information which are interleaved in a VOB. Each kind of data in the illustrated VOB has been converted into packets and packs according to MPEG2 standard. In this embodiment, each pack contains one packet called a PES (Packetized Elementary Stream) and is made up of a pack header, a packet header and a data field which together take up 2 KB. The contents of the "pack header" and "packet header" conform to MPEG2 standard, so that their explanation has been omitted and the following explanation will focus on the information used to express the different kinds of data.

The "stream ID" included in the packet header is an eight-bit field which shows whether the packet is a video data packet for a video data stream, a private packet, or an MPEG audio packet. Here, a "private packet" is data whose content can be freely defined under MPEG2 standard. In the present embodiment, private packet 1 is defined as audio data and sub-picture data while private packet 2 is defined as management information.

Private packet 1 further includes substream ID, which is an eight-bit field for showing whether the packet contains audio data or sub-picture data. The audio data defined by private packet 1 has a maximum of eight kinds of settings #0–#7 for each of linear PCM format and AC-3 format. The sub-picture data has a maximum of thirty-two kinds of settings #0–#31.

Here, for video data, the "data field" is made up of MPEG2 compressed data. For audio data, the "data field" is made up of data in one of MPEG, linear PCM or AC-3 format. Finally, for sub-picture data, the "data field" is made up of graphics data which has been compressed using run-length encoding.

Here, the reason these packs are given a size of 2 KB is that it coincides with the smallest retrieval unit for the reproduction device, which is to say the same size as the logical blocks (sectors) shown in FIG. 4.

Data Composition of the Management information in a VOB

Figure 11:
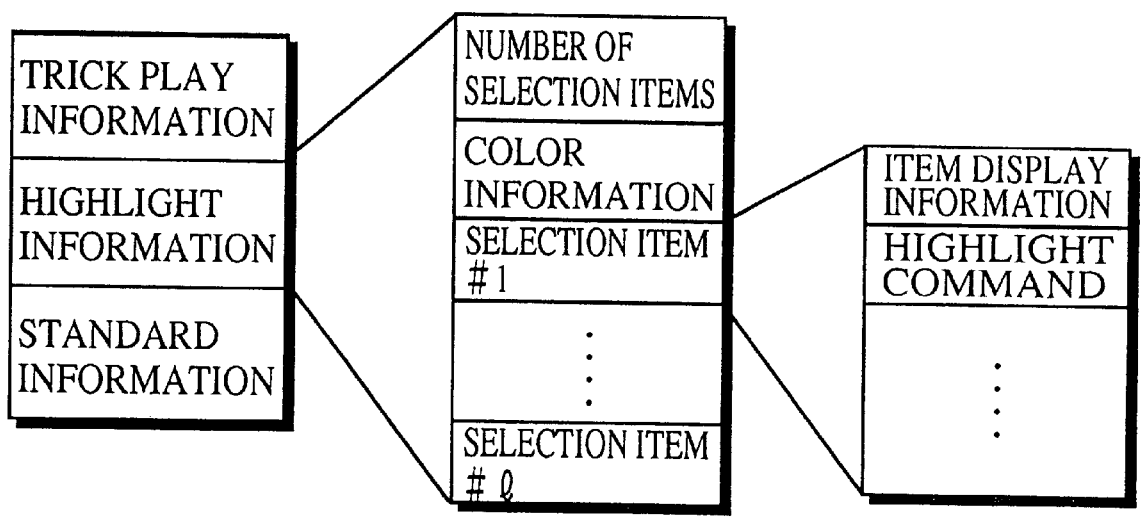
FIG. 11 shows the composition of each set of pack management information interleaved in the VOB shown in FIG. 9.

FIG. 11 shows the composition of each set of management information which is interleaved in the VOBs shown in FIG. 9. As shown in this drawing, the management information is made up of trick play information, highlight information and standard information.

The "trick play information" is information for trick plays such as the jump address for fast forward reproduction or rewind reproduction operations.

The "highlight" information shows the command information, which indicates the reproduction control corresponding to a selection of a menu according to an operation using a key on the remote controller, and the menu display information which uses the sub-picture data. More specifically, this is made up of a number of selection items, color information, and a plurality of selection items which are themselves made up of item display information and highlight commands. Here, by displaying item images using sub-picture data and receiving a user indication made as a selection operation on the remote controller 91, this information can achieve interactive dialogue with a user. Since this highlight information is included in each VOB as shown in FIG. 8, interactive operations can be achieved at any reproduction position in a VOB.

The "number of selection items" shows the number of items which can be selected by means of a user operation in response to the menu display. This number of selection items is set as the number of necessary items by the title developer, with a maximum of around 36 being preferable. This is because aside from interactive movies, it is necessary to set a large number of branch addresses for game applications and product catalog applications. In the present embodiment, the management information of 2 KB can only handle a maximum of 36 selection items.

The "color information" is information for indicating a change of color when an item is selected or confirmed by a user to indicate that the item has been selected or confirmed.

The plurality of "selection items" are a same number of pieces of information for indicating items in the menu as given in the "number of selection items" information, with each being information for achieving branch reproduction control in accordance with a user selection.

The "item display information" of each selection item expresses the area of the sub-picture for which the color is to be changed when an item is selected. As one example, if the button or icon showing the item is rectangular, this can be expressed using the coordinates of two opposite vertices (corners).

The "highlight commands" in each selection item are executed when the corresponding menu item is selected and confirmed and are set instructions for realizing interactive reproduction control. These commands include branch instructions indicating branch reproduction of another PGC and setting instructions for setting or changing the register values and the like inside the reproduction device. These commands are common to the pre-processing commands described above, post-processing commands and highlight commands. Accordingly, when a branch instruction which is set as a command in the highlight information is executed, a branch to a different program chain can be performed even during the reproduction of the VOB, without completing the reproduction of the present PGC.

The "standard information" stores information such as the reproduction functions supported by the data in the GOP.
Details of the Pre-Processing Commands, Post-Processing Commands and Commands in the Highlight Information FIG. 12 shows specific examples of the instructions in the pre-processing commands, the post-processing commands and the highlight commands. This figure shows a table which gives the OP code for each instruction (mnemonic display), the fields used as operands and a summary of the instruction.

The "Link" instruction has a field for setting the branch address and is an instruction for branching the reproduction route to the PGC indicated by the set branch address (PGC number). As one example, the instruction "Link PGC#2" indicates branch reproduction of PGC#2. If this link instruction is executed, the reproduction of the present VOB (and PGC) is cancelled and the reproduction of the PGC given as the operand of the instruction is commenced. This kind of command is mainly used as a post-processing command or as a highlight command.

The "CmpRegLink" instruction has four fields which indicate a register number, an integer value (immediate value), a condition and a branch address, and is an instruction which indicates a branch to the PGC indicated by the branch address when, as a result of the comparison between the register value and the immediate value, the conditions for the branch are satisfied. These conditions can be set as any of "=" equal, "NOT=" not equal, "<" less than, ">" greater than, "≦" less than or equal or "≧" greater than or equal. As one example, the instruction "CmpRegLink R1,#9,>,PGC#4" indicates a branch to PGC#4 if the value in register 1 is greater than the immediate value 9. This kind of instruction is mainly used as a post-processing command or as a highlight command.

The instruction "SetRegLink" has four fields which indicate a register number, an integer value (immediate value), a kind of operation (calculation) and a branch address, and is an instruction which stores the result of a calculation using a register value and the immediate value in the register and indicates a branch to the PGC indicated by the branch address. Here, substitution, addition, subtraction, remainder calculations, Boolean operations and the like are all examples of such operations. As one example, the instruction "SetRegLink R,#4,add,PGC#4" indicates a branch to PGC#4 after the immediate value "4" has been added to the value in register 1. This kind of instruction is mainly used as a post-processing command or as a highlight command.

The instruction "SetReg" has three fields which indicate a register number, an integer value (immediate value), and a kind of operation (calculation). It the same a "SetRegLink" instruction except that it does not include a branch indication. Such "SetReg" instructions are mainly used as highlight commands.

The instruction "Random" has a register number field and an immediate value field and generates a random integer number between one and the immediate value, which it then substitutes into the general register indicated by the register number field.

The instruction "SetTime" includes a timer value field and is an instruction for setting the indicated timer value and for activating the timer.

The aforementioned branch instructions (Link instructions, CmpRegLink instructions, SetRegLink instructions) only contain one branch address field, although when the PGC indicated as a branch address is part of a block, as shown in FIGS. 7 and 8, it is unnecessary to specify a plurality of different branch addresses in accordance with each level, so that it is sufficient to specify any one PGC in the block. This is because a PGC is selected by the reproduction device using the attribute table in accordance with the set reproduction level. Also, the inclusion of only one branch address field in a branch instruction gives the advantage that when the such instructions are used, especially in the highlight information in the pack management information, a greater number of such commands can be set by the title developer (corresponding to the maximum of 36 selection items). As one example, when the length of a branch instruction is set as 8 bytes (64 bits), a maximum of 288 (=8*36) bytes is sufficient, so that this can be easily included into pack management information of 2 KB size (the smallest unit for disc retrieval).

Entire Construction of the Reproduction Device

Figure 13A:
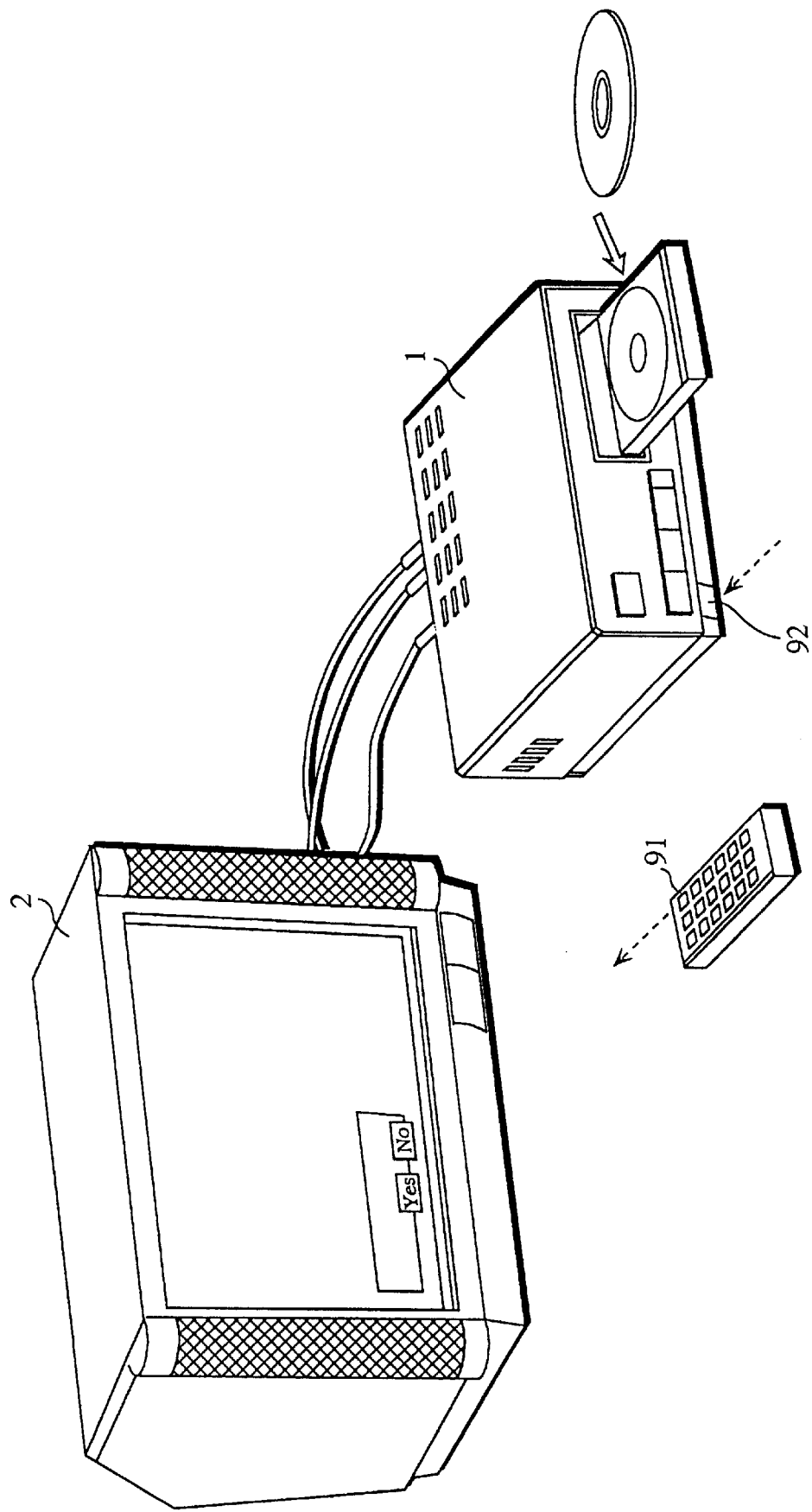
FIG. 13A shows a perspective view of the reproduction device of the present embodiment.
Figure 13B:
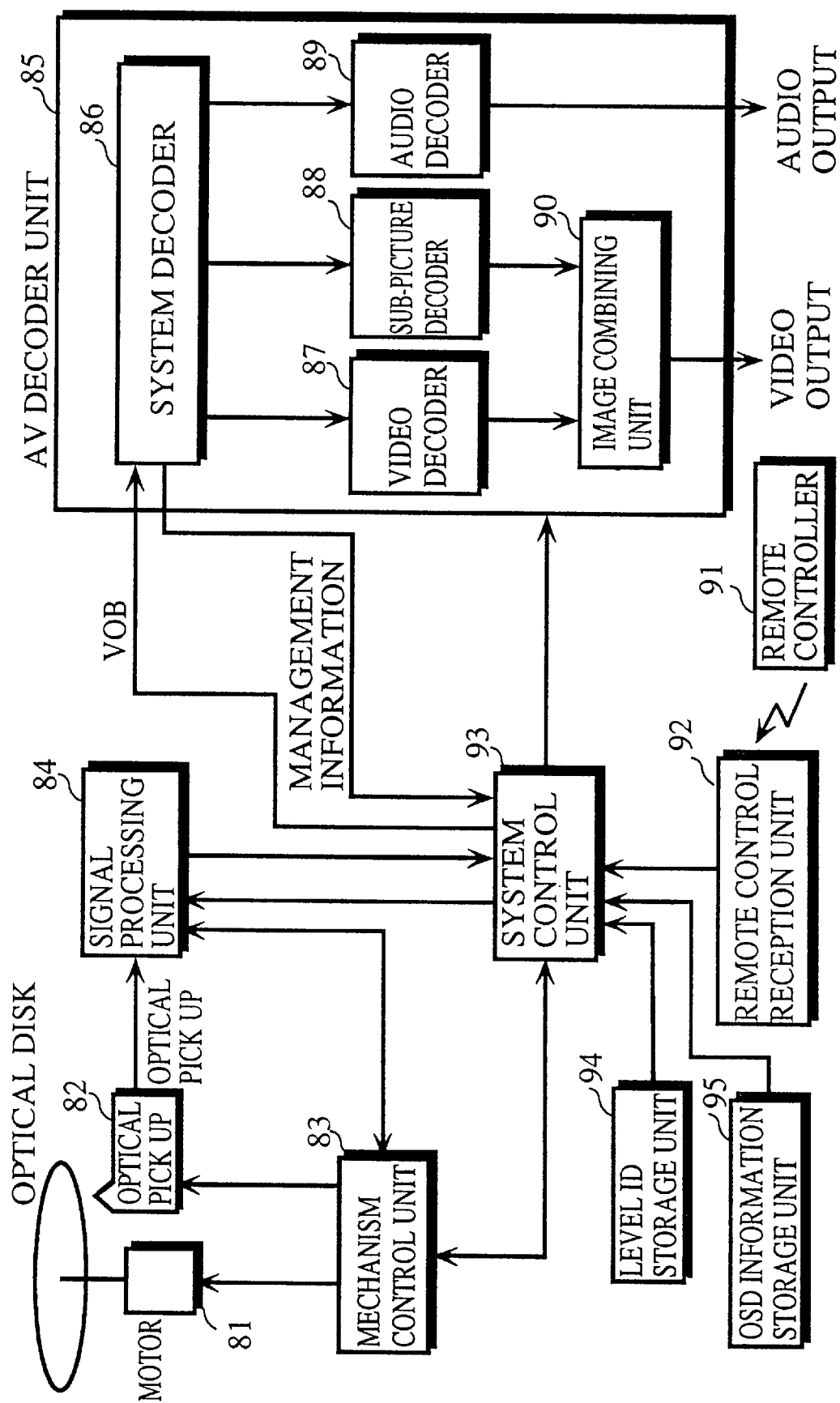
FIG. 13B is a block diagram showing the entire reproduction device in the embodiment of the present invention.

FIG. 13B shows a block diagram for the entire construction of the reproduction device in the present embodiment. The reproduction device is made up of a motor 81, an optical pickup 82, a mechanism control unit 83, a signal processing unit 84, an AV decoder unit 85, a system decoder 86, a remote controller 91, a remote control reception unit 92, a system control unit 93, a level ID storage unit 94 and an OSD information storage unit 95. The system decoder 86 is further composed of a video decoder 87, a sub-picture decoder 88, an audio decoder 89 and an image combining unit 90.

The mechanism control unit 83 controls the mechanism which includes the motor 81 for driving the disc and the optical pickup 82 for reading the signal recorded on the disc. More specifically, the mechanism control unit 83 adjusts the speed of the motor in accordance with the track position indicated by the system control unit 93 while at the same time moving the pickup position by driving the actuator of the optical pickup 82 and, having detected a desired track through servo control, waiting until the revolution of the disc has reached the point where the desired sector is recorded before finally continuously reading the signal from the desired position.

The signal processing unit 84 executes signal processing, such as amplification, wave-shaping, demodulation, and error correction, for the signal read by the optical pickup 82.

Once the signal processing unit 84 has amplified, wave-shaped, binary converted, demodulated, and error corrected the signal read by the optical pickup 82, it stores the signal in logical block units in the buffer memory (not illustrated) of system control unit 93. The file management information in the data in the buffer memory is read by system control unit 93 and the VOB in the data in the buffer memory is transferred from the buffer memory to the system decoder 86 by control by the system control unit 93.

The AV decoder unit 85 converts the received VOB into the original video signal and audio signal.

The system decoder 86 determines the stream ID and subsystem stream ID for each packet included in the VOB transferred from the buffer memory and outputs video data to the video decoder 87, audio data to the audio decoder 89, sub-picture data to the sub-picture decoder 88 and management information to the system control unit 93. In doing so, the system decoder 86 outputs to the audio decoder 89 and the sub-picture decoder 88 only the audio data and sub-picture data whose number corresponds to the numbers indicated by the system control unit 93, out of the plurality of pieces of audio data and sub-picture data, with the remaining pieces of data being discarded. The management information outputted by the system control unit 93 is stored in a buffer which is separate to the buffer memory described above. The content of this buffer is renewed every time new management information is outputted.

The video decoder 87 decodes the video data inputted from the system decoder 86 and, having decompressed the data, outputs it as a digital video signal to the image combining unit 90.

When the sub-picture data inputted from the system decoder 86 is run-length compressed image data, the sub-picture decoder 88 decodes it, decompresses it and outputs it in the same format as the video data to the image combining unit 90. In doing so, it is possible for the colors in the image data to be changed in accordance with the color information.

The audio decoder 89 decodes the audio data inputted from the system decoder 86, decompresses it and outputs it as digital audio data.

The image combining unit 90 combines the output of the video decoder 87 and the output of the sub-picture decoder 88 according to proportions indicated by the system control unit 93 and outputs the result as a video signal. This signal is converted into an analog signal and is then inputted into a display device.

Figure 13C:
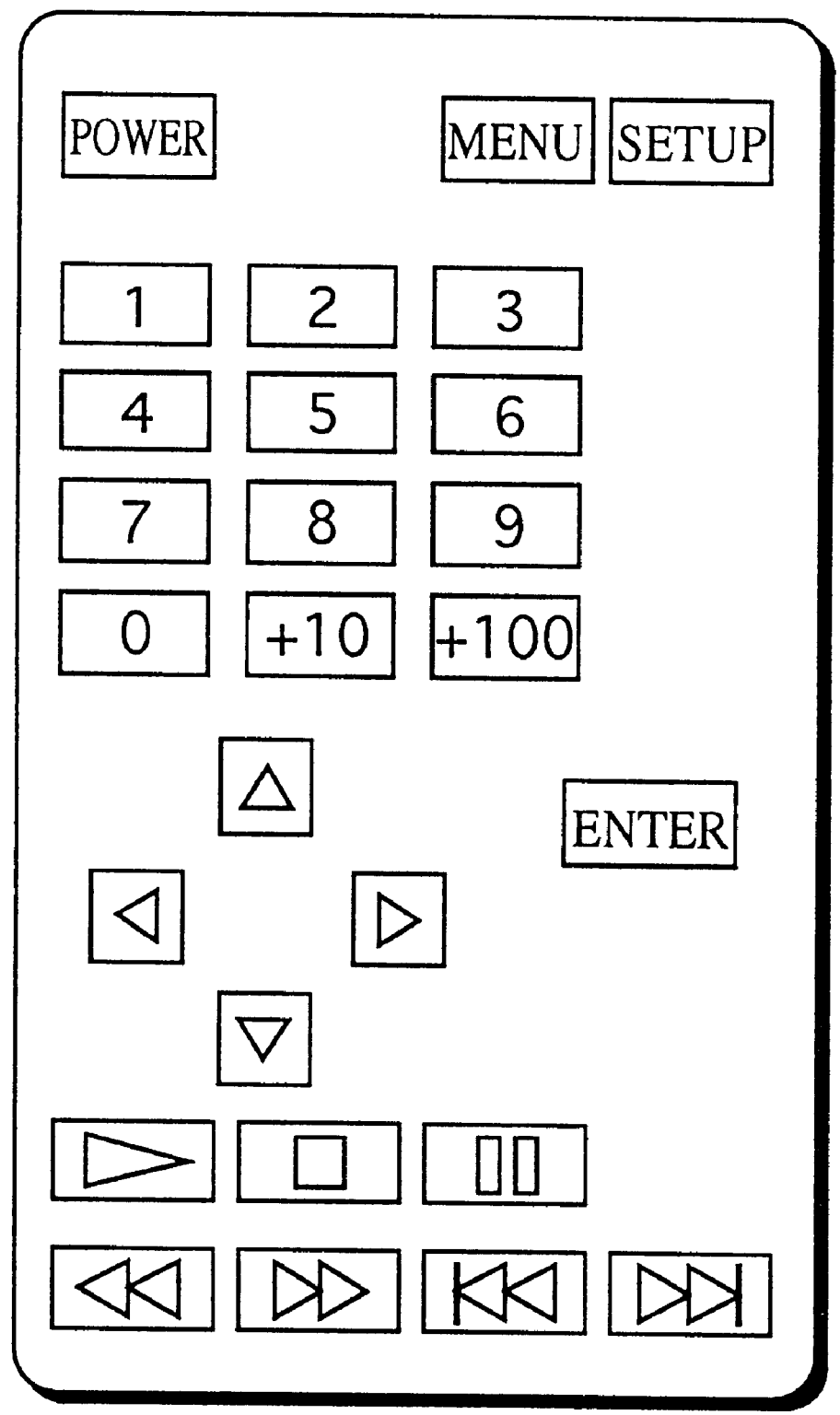
FIG. 13C shows an example key arrangement of the remote controller 91 used with the present reproduction device.

The remote controller 91 receives reproduction control indications made by user operations. An example key layout of the remote controller 91 is shown in FIG. 13C. The following is a brief explanation of only the keys which specifically relate to the present invention. The "menu" key is used to call the universal menu which can be displayed at any point during reproduction. The numeral keys and arrow keys are used for making menu selections. The "enter" key is used for confirming a selected menu item.

The remote control reception unit 92 receives the key signal infrared transmitted from the remote controller 91 in response to the depression of a key and informs the system control unit 93 of the key data using an interrupt process.

The system control unit 93 controls the entire reproduction device. It is composed of a program memory for storing a program for realizing the functions of the system control unit, a buffer memory for storing data for logical blocks, a CPU for executing the program, a general register, a timer and a random number generator. More specifically, when the data read from the buffer memory is file management information, the system control unit 93 performs reproduction control for the signal processing unit 84 in accordance with the content of this data, while when the data is a VOB, the data is directly transferred from the buffer memory to the AV decoder unit 85. For the mechanism control unit 83, the system control unit 93 calculates the number of the track on the disc which corresponds to the next logical block to be read, indicates the track position and indicates block reading control to the mechanism control unit 83. Also, on being interrupted by the remote control reception unit 92, the system control unit 93 is informed of the key data corresponding to the depressed key and performs reproduction control corresponding to the key data., The OSD information storage unit 95 stores the OSD information which displays the various kinds of player setting menus for the present reproduction device. Here, one of these player setting menus is the level setting menu for receiving a setting of the parental lock level in accordance with a user operation. This particular OSD information is retrieved by the system control unit 93 whenever the reproduction device is switched ON, whenever the reproduction device is reset, or whenever the "Setup" key on the remote controller 91 is depressed, with it then being outputted by the AV decoder unit 85 as a reproduction signal.

Construction of the System Decoder 86

FIG. 14 shows a block diagram for the construction of the system decoder 86 shown in FIG. 13B. As shown in this drawing, the system decoder 86 is made up of an MPEG decoder 120, a sub-picture/audio separator 121, sub-picture selection unit 122 and an audio selection unit 123.

The MPEG decoder 120 determines the kind of pack by referring to the stream ID in the pack header of each data pack included in the VOB transferred from the buffer memory and, depending on its determination result, outputs the packet data to the video decoder 87 for a video packet, to the sub-picture/audio separator 121 for private packet 1, to the system control unit 93 for private packet 2 and to the audio selection unit 123 for an MPEG audio packet.

The sub-picture/audio separator 121 determines the kind of packet by referring to the substream ID in the packet header of the private packet 2 inputted from the MPEG decoder 120 and, depending on its determination result, outputs the data to sub-picture selection unit 122 if it is sub-picture data or to the audio selection unit 123 if it is audio data.

The sub-picture selection unit 122 outputs to the sub-picture decoder 88 only the sub-picture data which has the number indicated by the system control unit 93, out of all the sub-picture data sent from the sub-picture/audio separator 121. The remaining sub-picture data is discarded.

The audio selection unit 123 outputs to the audio decoder 89 only the audio data which has the number indicated by the system control unit 93, out of the MPEG audio inputted from the MPEG decoder 120 and the audio data inputted from the sub-picture/audio separator 121. The remaining audio data is discarded.

Simplified Processing of the System Control Unit 93

Figure 15:
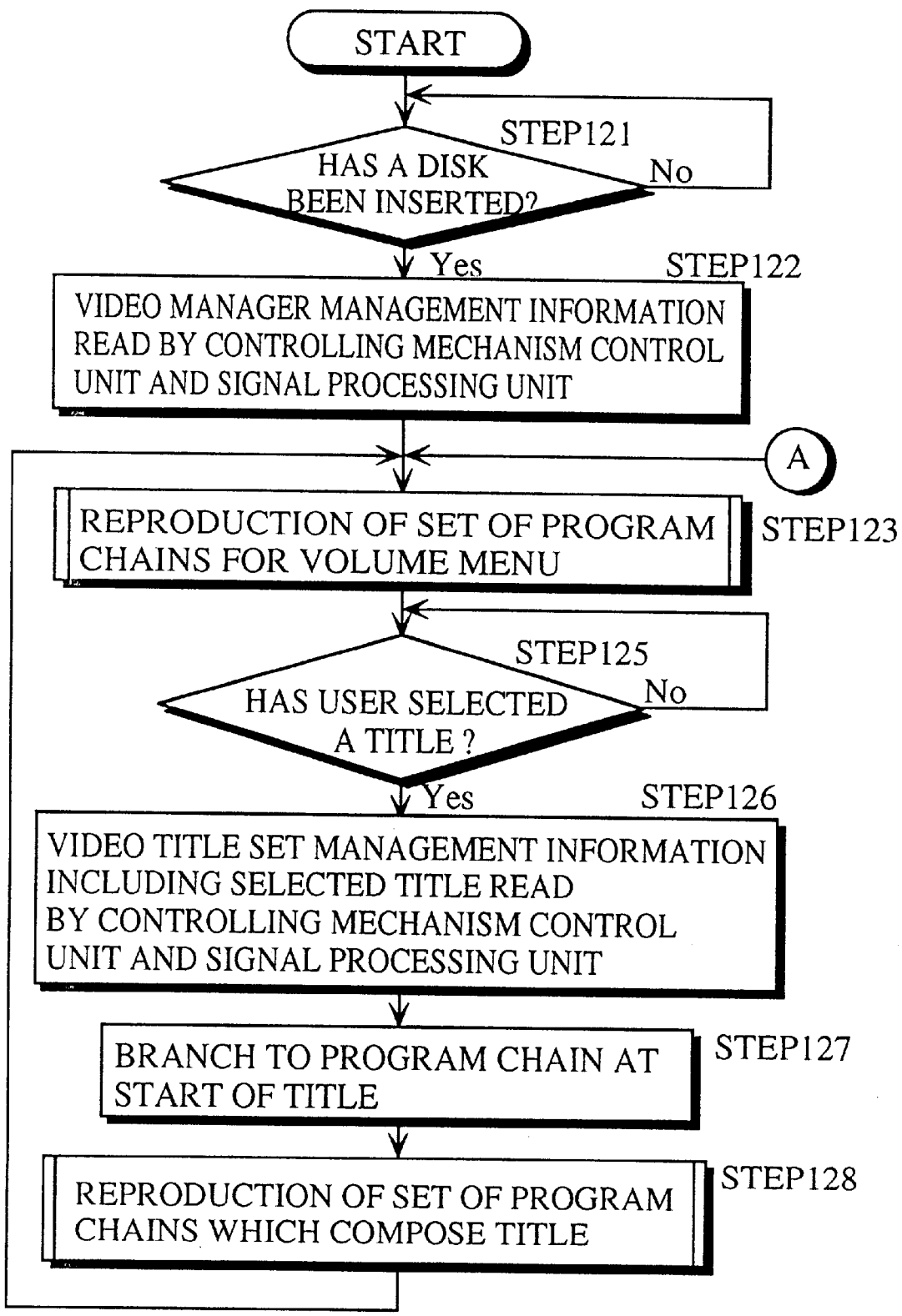
FIG. 15 is a flowchart for the processing content of the system control unit 93 shown in FIG. 13B.

FIG. 15 shows a flowchart for the processing content of the system control unit 93 shown in FIG. 13B.

First, on detecting that a disc is set in the reproduction device, the system control unit 93 controls the mechanism control unit 83 and the signal processing unit 84 and has disc rotation control performed until stabilized retrieval from the disc can be performed, at which point the optical pickup is moved, the volume management region shown in FIG. 4 is read and, based on the information in the volume management region, the video manager is read (steps 121, 122). Next, the system control unit 93 reproduces the PGC for the volume menu, based on the volume menu management information in the video manager (step 123). By doing so, the volume menu is displayed. This volume menu is a menu which allows the user to select a title to be reproduced out of all the titles recorded on the optical disc.

Once the user has selected their desired title (step 125), the system control unit 93, in accordance with the set of titles management information in the video manager, determines the video title which stores this title. The system control unit 93 reads the video title set management information of the video title set which includes the selected title and the attribute table, stores the data (step 126), and branches to the PGC at the start of the selected title (step 127). The system control unit 93 reproduces the set of PGCs and returns to step 123 on completing the reproduction (step 128). When, during the reproduction of the set of PGCs, several PGCs have been block converted, the system control unit 93 selects and reproduces a PGC in accordance with the level ID stored by the level ID storage unit 94.

Reproduction Process of the System Control Unit 93

Figure 16:
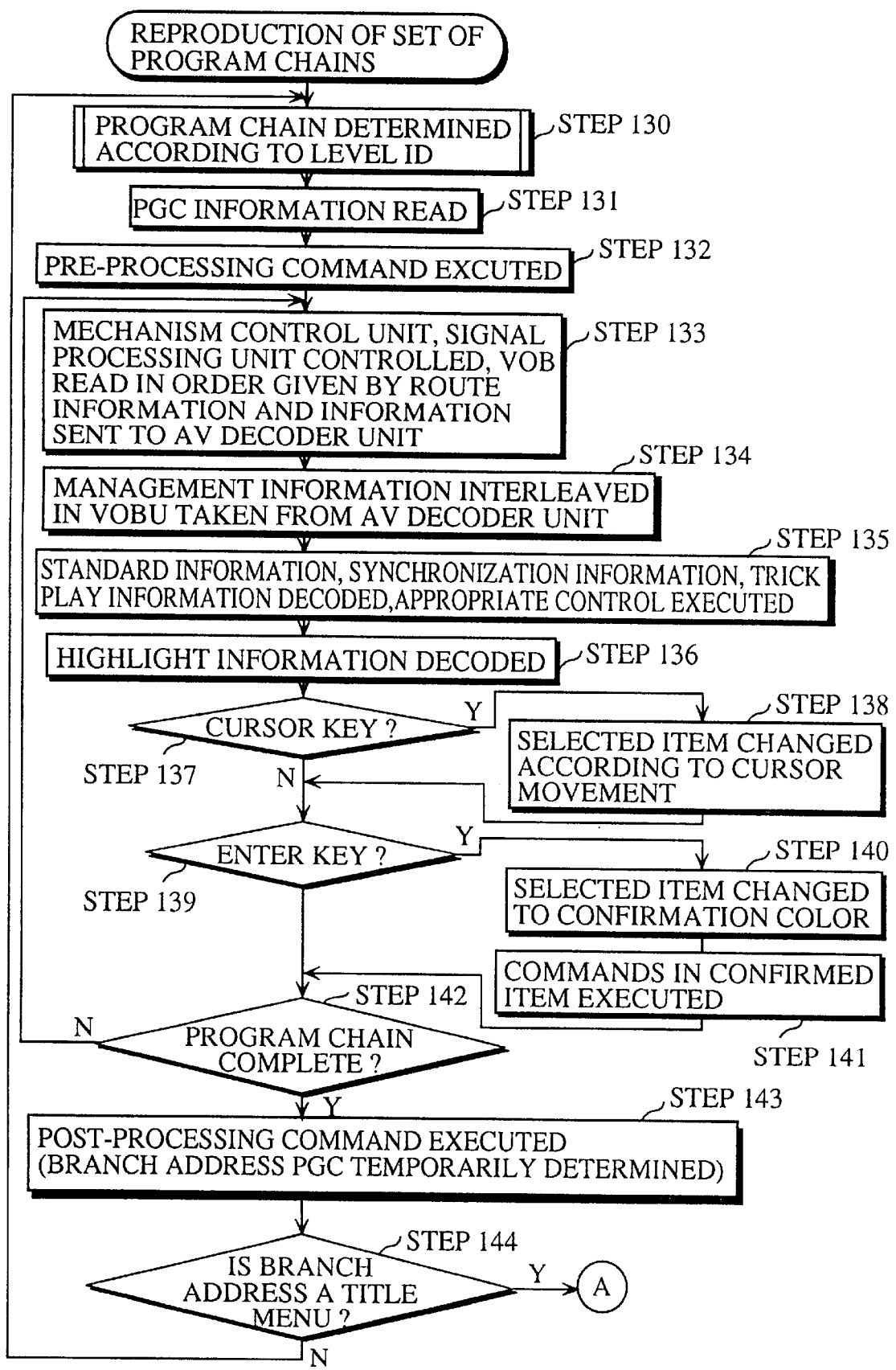
FIG. 16 is a flowchart for the details of the reproducing processing of a set of PGCs by the system control unit 93.

FIG. 16 shows a detailed flowchart for the reproduction process of a set of program chains by system control unit 93 which was shown as step 128 in FIG. 15. This process includes the same processing as step 123 (reproduction of the group of PGC in the video manager) in FIG. 15.

In FIG. 16, the system control unit 93 first refers to the attribute table stored inside the reproduction device and then determines the PGC in accordance with the level ID stored in the level ID storage unit 94 (step 130), before retrieving the PGC information for the determined PGC (step 131) and executing the pre-processing commands (step 132). As examples of pre-processing commands, a "SetReg" instruction is set, sets the value of a register (such as an initial value), while a "SetTime" instruction sets the timer value in addition to activating the timer.

Next, system control unit 93 controls the mechanism control unit 83 and the signal processing unit 84 and so reads the VOBs in order of the pointers written in the route information shown in FIGS. 7 and 9 (step 133). The retrieved VOBs are separated and reproduced by the AV decoder unit 85. At this point, the separated video and sub-picture are displayed on the display screen (not illustrated), with audio output also being commenced using the audio data. After this, the system control unit 93 receives the management information separated by the AV decoder unit 85 (step 134), decodes the standard information and trick play information in the management information shown in FIG. 10 and executes control in accordance with the decoding result (step 135).

Furthermore, the system control unit 93 decodes the highlight information in the management information (step 136) and, when there has been a reception from the remote control reception unit 92 of key data corresponding to a cursor key or numeral key, changes the selected item on the display screen and its selection color (steps 137, 138), or when there has been a reception of key data corresponding to the "enter" key, changes the color of the selected item on the display screen to the confirmation color (steps 139, 140), as well as executing the command corresponding to the confirmed item (step 141). If, at this point, a branch instruction such as a "Link" instruction, a "CmpRegLink" instruction, a "SetRegLink" instruction or the like is set, a branch may be performed to the PGC indicated by the branch instruction. This is to say, the processing advances to step 130 for the indicated PGC. In this case, the reproduction of the remaining part of the PGC which was mid-reproduction is cancelled and the reproduction of the new PGC is commenced.

When no branch is performed, the system control unit 93 returns to step 133 when there is a next VOB to be reproduced next (step 142: no), or, when there is no VOB to be reproduced next (when the PGC has been completed) (step 142:yes), temporarily determines the PGC of the branch address by executing the post-processing command (step 143). The execution of this post-processing command is the same as for the pre-processing commands. Additionally, when the branch address is a title menu, a return is performed to step 123 shown in FIG. 15 (step 144:no) while if it is not a title menu, the processing returns to step 130 (step 144:yes).

Figure 17:
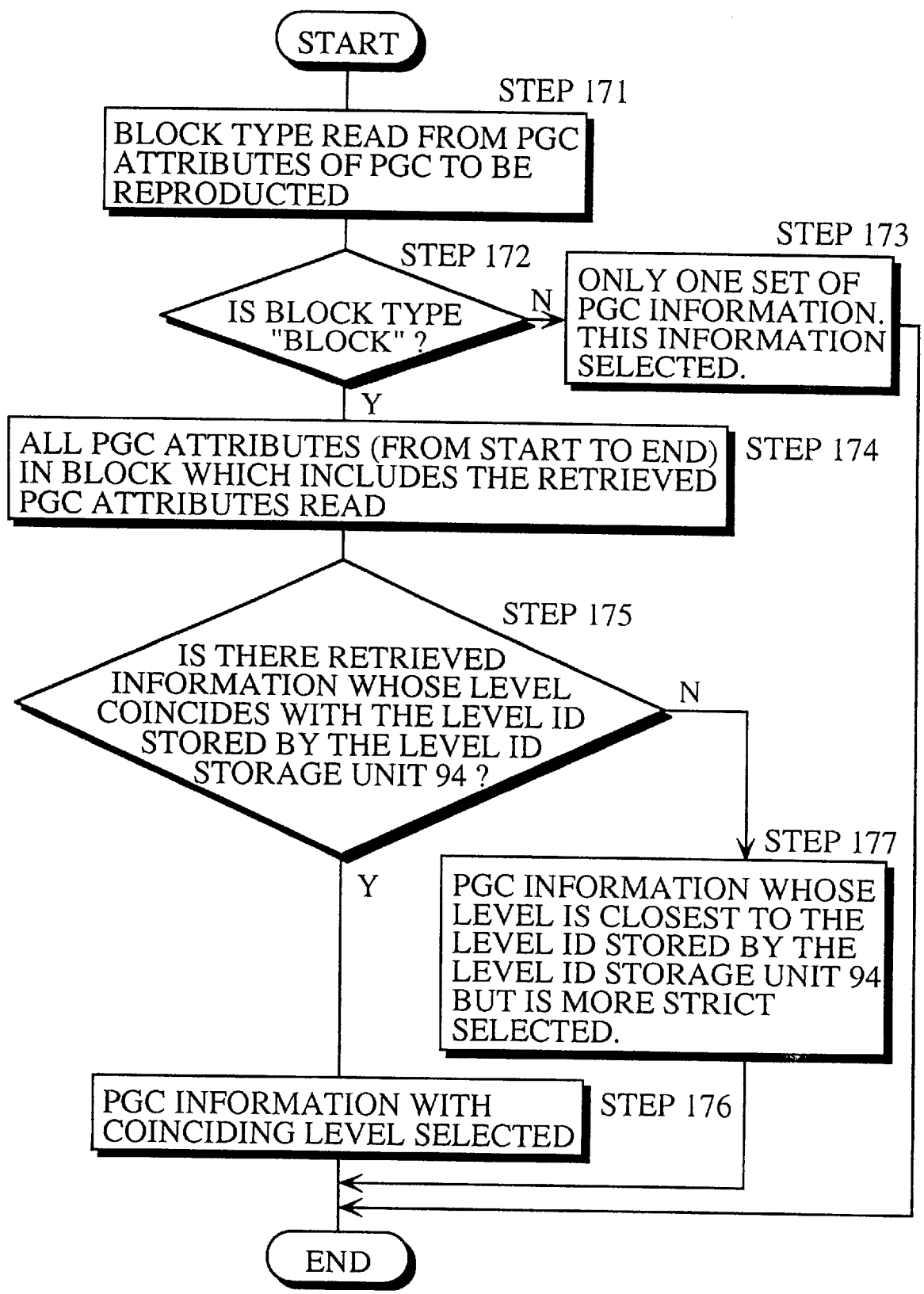
FIG. 17 is a detailed flowchart for the PGC determination process in accordance with level ID performed by the system control unit 93 which was shown as step 130 in FIG. 16.

FIG. 17 is a detailed flowchart for the determination process of a PGC executed by the system control unit 93 in accordance with the level ID which is shown as step 130 in FIG. 16. In FIG. 17, the system control unit 93 reads the block type from the PGC attributes of the PGC to be reproduced given in the attribute table shown in FIG. 7 (step 171) and, if the block type is non-block, the PGC information corresponding to these PGC attributes is selected (Step 172, 173). If the block type is block, all of the PGC attributes included in the block having this PGC attribute (from the PGC attribute whose block mode is "start" to the PGC attribute whose block mode is "end") are retrieved (step 172, step 174). Following this, if there is a level ID in the retrieved block which corresponds to the level ID stored by the level ID storage unit 94, the system control unit 93 selects the PGC information which has the corresponding level ID (step 175, step 176). If there is no level ID in the retrieved block which corresponds to the level ID stored by the level ID storage unit 94, the system control unit 93 selects the PGC information which has a level ID which is closest to the level to the stored level ID but which represents a more restricted video content (step 175, step 177).

By means of this kind of determination process, the branch address PGC which was temporarily set is then confirmed, so that the PGC information which has a level ID which corresponds to (or is closest to) the level ID stored by the level ID storage unit 94 can be selected. Also, by means of post-processing commands and the highlight commands, a branch can be performed to a block-converted PGC, so that it is not necessary to separately specify the branch address for each level ID, so that any PGC out of a block may be specified as a branch address. Accordingly, branches to PGCs which have been block converted can be achieved by the aforementioned branch instructions (such as Link instructions, CmpRegLink instructions and SetRegLink instructions) which only have one branch address field.

Operation Example

The following explanation will first focus on the user registration of a level ID in the present reproduction device.

Registration of Level ID

When the reproduction device is switched on, or when it is detected that the "Setup" key on the remote controller 91 has been depressed, the system control unit 93 of the present reproduction device retrieves the OSD information in the OSD information storage unit 95 shown in FIG. 13B and outputs the OSD information to the AV decoder unit 85, so that the various player setting menus are displayed on the display screen (not illustrated) and the various settings of the reproduction device can be performed by user operations.

Figure 18:
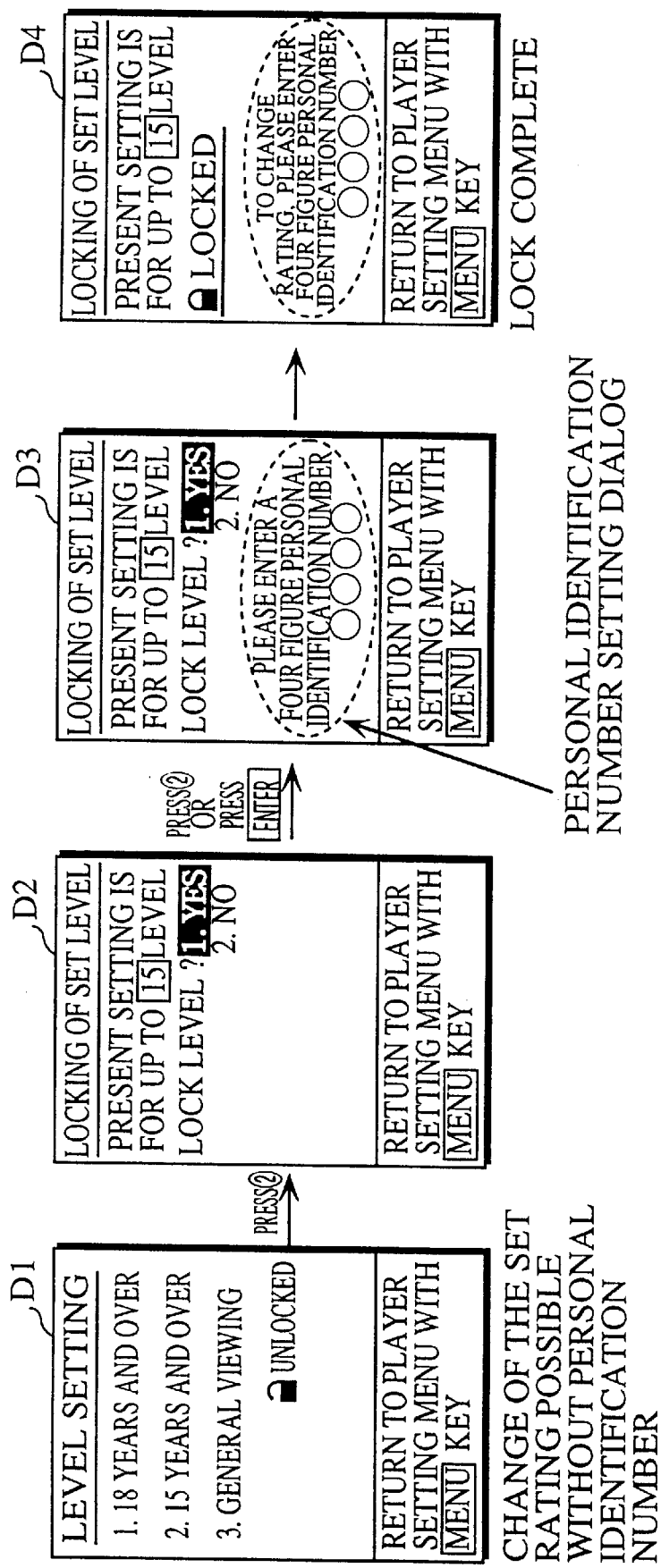
FIG. 18 shows an example of a display screen for a level setting menu, out of the various kinds of player setting menus.

FIG. 18 shows an example of the display screen for the level setting menu, out of the various player setting menus. In the display of menu screen D1 in FIG. 18, the system control unit 93 receives an selection indication for any of "1. 18 years and over", "2. 15 years and over" or "3. General viewing" by means of an operation of the numeral keys on the remote controller 91. When a selection is made during the display of menu screen D1, the system control unit 93 retrieves menu screen D2 from the OSD information storage unit 95 and has it displayed by the AV decoder unit 85. Here, if "1. Yes" (Activate Lock) is selected in this menu screen D2, a personal identification number is inputted during the display of menu screen D3. At this point, the system control unit 93 stores the selection result (level ID) from the menu screen D1 and the personal identification number from menu display D3 in the level ID storage unit 94. Also, the menu screen D4 is displayed for user confirmation.

In order to make a level changing operation, the input of a personal identification number can be added to menu screen D1, with the menu screens D2–D4 following this in the same way as described above.

Reproduction Operation

Figure 19:
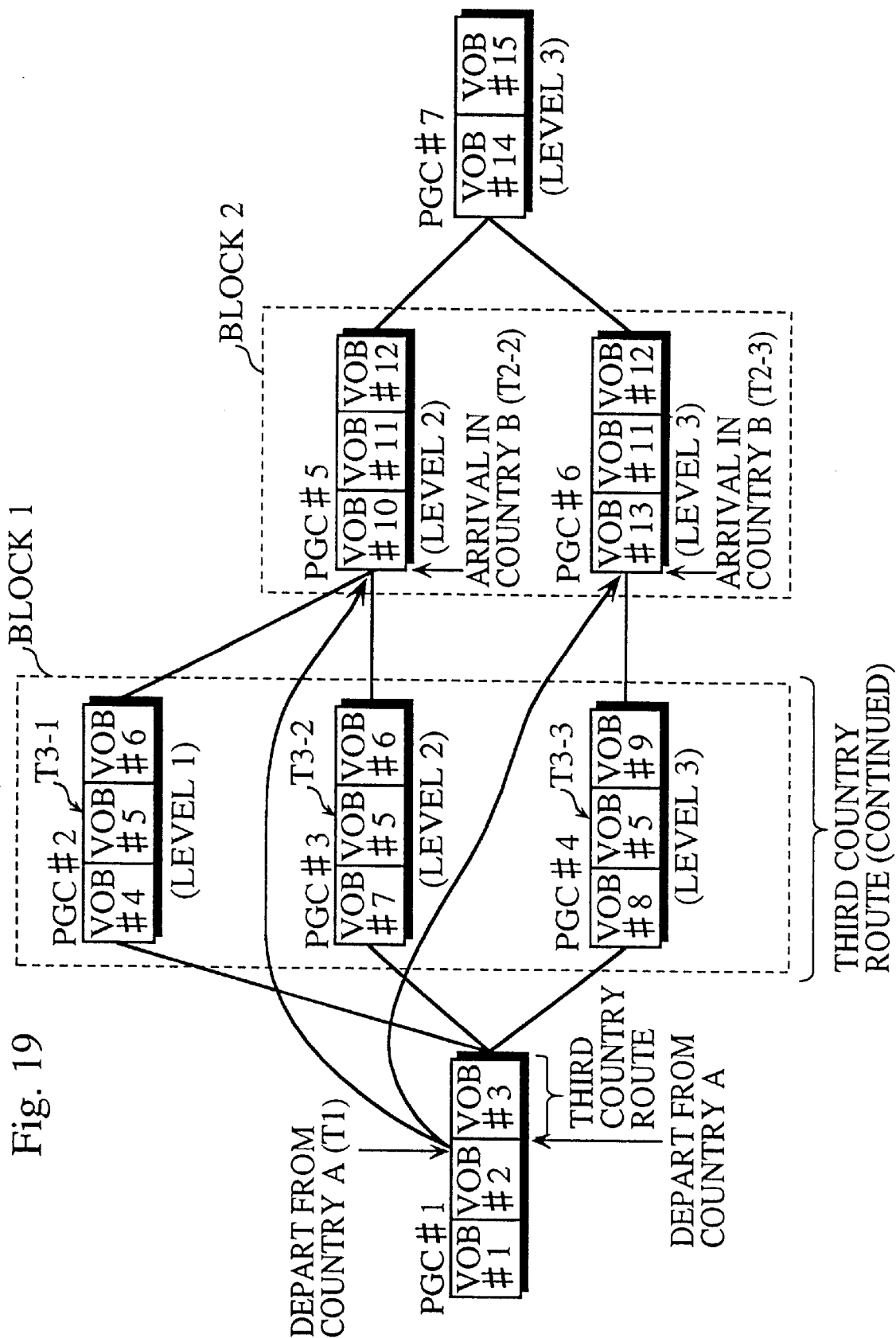
FIG. 19 shows the relations between PGC and VOB for the example title set of the three versions of the interactive movie shown in FIG. 8.

FIG. 19 is a drawing for showing the relationship between PGC and VOBs in the example of a title set of the interactive movie with three versions which was shown in FIG. 8.

In PGC#1, a pointer for VOB#1, a pointer for VOB#2 and a pointer for VOB#3are indicated in that order in the route information for PGC information #1 shown in FIG. 5. In the same way, pointers for VOBs are indicated in their reproduction order in the route information for PGCs #2–#7.

In the illustrated example, VOBs #4, #7 and #8 have a similar content, but include scenes which are level 1 (18 years and older), level 2 (15 years and older) and level 3 (general viewing), respectively. In the same way, VOBs #6 and #9 have a similar content, but include scenes which are level 2 (15 years and older) and level 3 (general viewing), respectively. The same is true for VOB#10 and VOB#13. The remaining VOBs only include scenes which are level 3.

Here, the post-processing commands in the PGC information for PGC #1–#7 are as described below.

Post-processing command of PGC#1=Link PGC#2 instruction

Post-processing command of PGC#2–#4=Link PGC#5 instruction

Post-processing command of PGC#5,#6=Link PGC#7 instruction

Once again, the PGC attribute information for PGC#1–#7 are as shown in FIG. 7. In this case, the post-processing command of PGC#1 indicates a branch to PGC#2, but in accordance with the determination process of FIG. 17, the PGC information which has the level which corresponds to (or is closest to) the level ID stored by the level ID storage unit 94 is selected by the system control unit 93. This is to say, if the level ID stored by the level ID storage unit 94 is "3", PGC#4 is selected out of the attribute table shown in FIG. 7, while PGC#3 is selected when the stored level ID is "2", and PGC#2 is selected when the stored level ID is "1".

The post-processing command of each of PGC#2–#4 is a branch to PGC#5 and, in exactly the same way as above, one of PGC#5 and PGC#6 is selected by the system control unit 93 in accordance with the stored level ID.

Accordingly, the reproduction orders of PGC for each level ID are as shown below.

Level 1 version=PGC #1→PGC #2→PGC #5→PGC #7

Level 2 version=PGC #1→PGC #3→PGC #5→PGC #7

Level 3 version=PGC #1→PGC #4→PGC #6→PGC #7

For the reproduction of the title set of FIG. 19, a shortcut from the reproduction position T1 shown in VOB#2 of PGC#1 in FIG. 19 to PGC#5 or PGC#6 can be realized in the manner described below. Here, FIG. 20 is a drawing showing the plurality of VOBU at reproduction position T1 of VOB#2 and their reproduction results.

Figure 20:
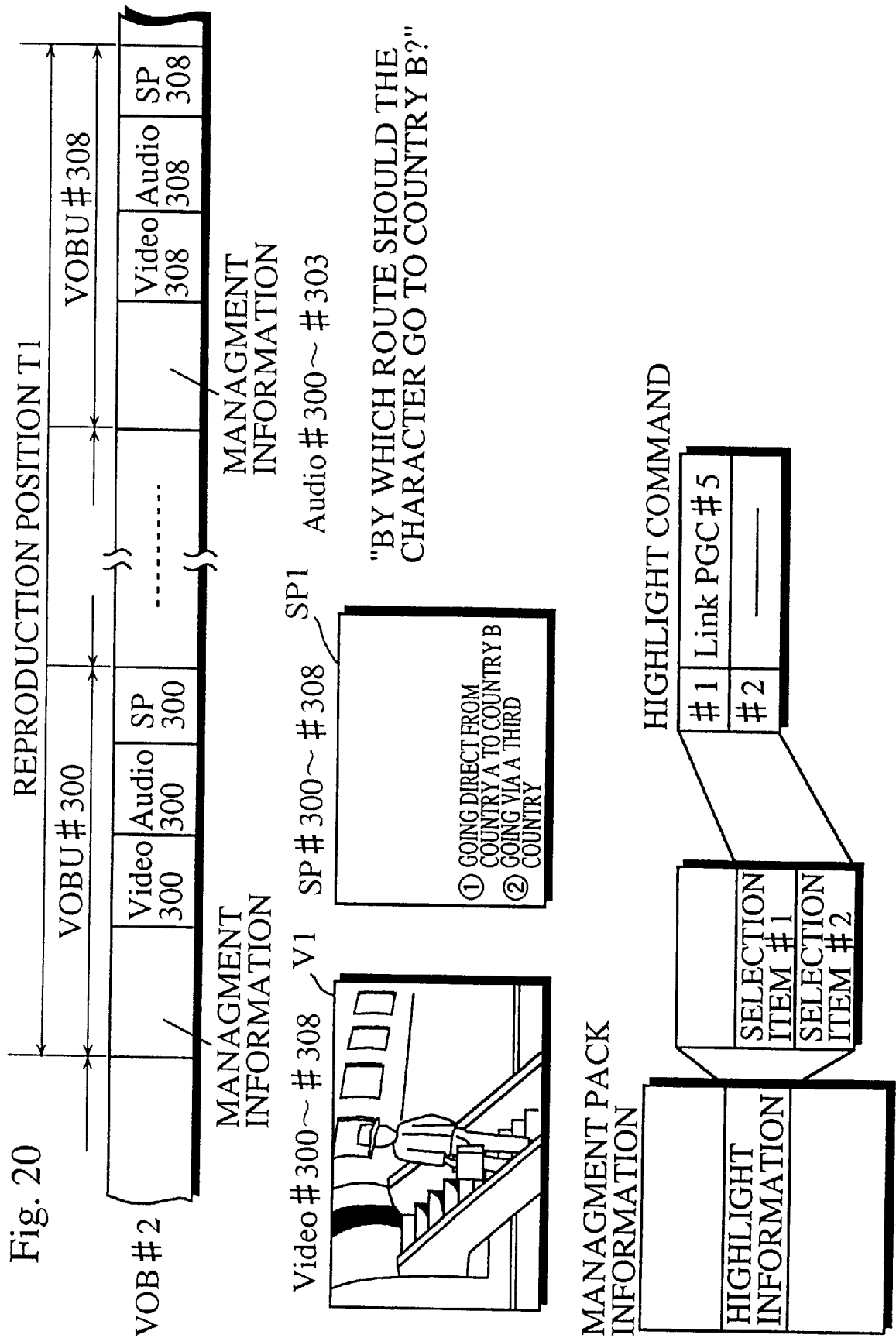
FIG. 20 shows a plurality of VOBU and their reproduction result for reproduction position T1 in VOB#2.

In FIG. 20, reproduction position T1 of VOB#2 is made up VOBU #300–VOBU #308 and is a scene which lasts approximately five seconds.

In this figure, video image V1 is video data made up of video data "video 300"–"video 308" in the aforementioned VOBU and is a scene where passengers board an airplane.

Still image SP1 is made up of sub-picture data SP300–SP308 in the aforementioned VOBU and shows selection item #1 "Going direct from country A to country B" and selection item #2 "Going via a third country", with these being superimposed on the video image V1.

The audio signal "audio 300" to "audio 303" is a voice signal whose content is "By which route should the character go to country B?".

The sets of management information #300–#308 are all of the same content, which are highlight commands corresponding to the aforementioned selection items #1 and #2 in the highlight information shown in the drawing. Here, the highlight command which corresponds to selection item #1 is "Link PGC#5", while no highlight command is set corresponding to selection item #2.

If, during the reproduction of this reproduction position T1, the user selects selection item #1 using the remote controller 91, the command "Link PGC#5", which temporarily sets PGC#5 as the branch address, is executed by the system control unit 93 and, by means of the determination process of FIG. 17, the PGC out of PGC#5 and PGC#6 which has a level ID which is in accordance with (or is closest to) the level ID stored by the level ID storage unit 94 is actually selected. By doing so, VOB#3 and block 1 in FIG. 19 are skipped. Alternatively, if during the reproduction of this reproduction position T1, the user selects selection item #2 using the remote controller 91, since no highlight command has been set, no branch is performed and the reproduction continues as normal.

Here, in the same way as above, if "Link PGC#2" is set as highlight command for a different reproduction position in PGC #1, a shortcut to a PGC with an appropriate level ID in block 1 can be performed from that reproduction position.

As described above, since highlight information can be set for every VOBU unit (around 0.5–1.0 seconds) as shown in FIGS. 9 and 11, by setting branch instructions (see FIG. 12) as highlight commands, branches to other PGCs can be executed at any point during the reproduction of a VOB. Furthermore, even when the branch address indicated by a branch instruction is a plurality of PGCs of different levels which have been block converted, it is not necessary to indicate different branch addresses for the specific levels, so that it is sufficient to temporarily indicate any PGC number out of the block. Accordingly, the amount of information (number of branch instructions) for each VOBU can be reduced and a large saving of data amount can be made By doing so, there is no suppression in the amount of video data which can be stored in a VOBU, which means that a sufficient amount of data for the achieved of high-quality video can be maintained for video data.

As one example, if it is supposed that at one reproduction position of an interactive movie there are N possible branches which each represent a different development in the story and separate blocks on M different levels (versions) for each branch address, it is no longer necessary to have a total of N*M branch instructions for this reproduction position, so that N branch instructions are sufficient. More specifically, since in the present embodiment, branch instructions are eight bytes long and there are a maximum of 36 selection items, the maximum necessary amount of data for the highlight commands is 288 (=8*36) bytes. This can easily be included into the pack management information of 2 KB size (the smallest unit for disc retrieval), despite enabling as many as 36 different developments in the story to be used. By doing so, the multimedia optical disc and reproduction device of the present invention can realize a variety of kinds of interactive reproduction.

If it is supposed here that a plurality of branch instructions which each indicate a different level were used, then the total number of bytes necessary for such branch instructions would increase in line with an increase in the number of levels, so that it would no longer be possible to fit the other kinds of information (trick play information, standard information) into one pack of management information. Here, since 2 KB is the smallest retrieval unit for the reproduction device, this means the size of the management information would have to double or treble to 4 KB or 6 KB. In such a situation, there is further harm in that the buffer size in the reproduction device which is used for the management information also has to be increased and in that storage capacity per unit time in a VOB which can be used for video data etc. is also reduced.

The above embodiment describes the case where the level ID for selective reproduction control is set in each VOB unit itself, although this need not be the case, so that it can alternatively be set in the PGC information table (attribute table) for controlling the reproduction order of VOBs. By doing so, it is possible for a plurality of block-converted PGCs to commonly contain VOBs on different levels. For the title developer, this means that it is only necessary to separately prepare VOBs for sections of video where different images are necessary on different levels.

In the above embodiment, the desirable arrangement order of PGC attributes in the attribute table is such that the levels in the level ID are in ascending order of strictness of video content. As one example, for the example of FIG. 7, the block-converted PGCs #2, #3 and #4 are arranged in ascending order of the strictness of the levels of their level IDs (1, 2, 3) which correspond to the order "start, middle, end" in the block modes. By using this kind of arrangement order, it becomes possible to make the actual setting of a PGC (see the process in FIG. 17) at high speed, in accordance with the registered level and the temporarily determined PGC.

As one example, suppose that in the determination process, the registered level is 3 and level of the temporarily determined PGC is 2. Here, if the block mode is start or middle, this means there is definitely a valid PGC in the lower entry of the attribute table. In this case, in step 174 in FIG. 17, the system control unit 93 does not need to read all of the PGC attributes in the block in the attribute table and so may instead only read the lower entry.

Furthermore, the aforementioned arrangement order is also desirable in order to prevent erroneous operation which does not observe the registered level, even when the PGCs are displayed totally at random. As one example, when a non-intended PGC is specified, which can be when a special function is prepared so that PGC numbers can be directly specified by the user making a remote control operation or when an erroneous operation occurs due to the reproduction device being knocked or to a disc retrieval error, if, in the determination process, the block mode of the PGC attribute in question is "end", there is no need to perform a search and it can be immediately determined that there is no PGC which can be reproduced at the registered level.

It should be noted here that while the above explanation has described the case when there are three level IDs (1–3), any number of such levels may be set. As one example, the six levels (G, PG, PG-13, R, NC-17, X) used by the American Board of Film Censors may be used. In the same way, five levels are used in Germany, three in Italy and four in Australia.

The above description focussed on an example where the levels 1–3 were self-imposed ratings set according to the extent to which sex scenes or violent scenes are present in the video content, although other kinds of ratings may be used. As examples, a no-cut version, a cinema version and a TV version may be used for a movie application while beginner, low level, intermediate and advanced may be set for a game application. Also, since levels such as beginner, low level, intermediate and advanced do not require a parental lock, the level ID storage unit 94 may be used as a special register inside the reproduction device for a temporary setting of reproduction level. In such a case, this level can be set according to a user indication at the beginning of the game.

It should be noted here that in the description of the present embodiment, the level numbers which are registered in the level ID storage unit 94 are the same as the level numbers given to each PGC in the PGC attribute table, but by preparing a conversion table, it is of course possible for the level numbers which can be registered in the level ID storage unit 94 to be set so as to merely correspond to the level numbers given to each PGC in the PGC attribute table. Such a conversion table can be stored on the disc, so that an application which requires PGC on eight levels can have such levels mapped to eight corresponding levels. For an example when there are PGC on the three levels, LV1, LV2 and LV3, the content of the conversion table can be as shown in the example below.

Content of Conversion Table

LV1→reproduce LV1 and reproduce LV2

LV2→reproduce LV3, reproduce LV4 and reproduce LV5

LV3→reproduce LV6, reproduce LV7 and reproduce LV8

For the above case, the level number stored in the level ID storage unit 94 can be mapped to the level numbers stored on the disc.

Also, the present embodiment describes the case where management information is arranged into GOPs which are the unit for decompression of video, although if a different compression technique is used, the management information may be stored in accordance with the units for that compression technique.

Also, for the present embodiment, the storage region for the highlight information may be commonly used with the storage region for the control information for skip reproduction, such as fast forward operations. The control data for skip reproduction needs to be arranged into each decompression unit of video data, so that the management information which stores such highlight information is arranged into each GOP as described above. As a result, if the storage region for the highlight information and the skip reproduction control information is not commonly used, the storage unit for the management information which stores the highlight information is not limited to a GOP, and instead can be arranged using a synchronization unit for image reproduction which is finer than the 0.5–1.0 second period, such as an image frame which has a reproduction time of 1/30 of one second.

It should be noted here that the "VOB position information table" in the PGC information includes a list of VOB position information giving the storage positions of VOBs, so that VOBs are retrieved by the disc reproduction device using this information. However, by writing the VOB position information in a part of the storage region which includes the VOBs, the device may be configured so that the optical pickup only reads part of a VOB. This kind of partial retrieval is called trimming. Here, parts of the trimmed VOBs are specified using units called cells. By having the VOB position information indicate a part of a region in this way, only the valid part of a VOB needs to be used, which leads to a great improvement in the efficiency with which the video material is used.

Also, the present embodiment described the case where one GOP is included in one VOB unit, although if the reproduction time of the stored video image is around 1.0 seconds, this need not be limited to one GOP, so that one VOB unit may be made up of two or three GOPs of a short reproduction time. In such a case, the management information may be arranged into the starting position of a consecutive plurality of GOPs, with this plurality of GOPs storing the valid reproduction control information.

It should also be noted that in the present embodiment, the case where the video information is stored using digital video data under MPEG2 standard was explained, although the present invention should not be limited to this format, so that any multimedia data format where video, audio and sub-pictures can be supplied together may be used, such as digital video under MPEG1 or digital video according to a conversion algorithm aside from DCT (Discrete Cosine Transform) as used under MPEG format.

Also, the present embodiment describes the case where a DVD is used as the optical disc, although any storage medium which can be used for storing a large amount of digital video may be used.

Also, for the attribute table shown in FIG. 7, the block type "non-block" in the PGC attributes may be set to include all of the levels for which reproduction is possible as the level ID. In this case, the level ID column for PGC#1 and PGC#7 in FIG. 7 would read "1, 2, 3", while the level ID column for PGC#5 would read "1, 2". Also, for the determination process of the system control unit 93 shown in FIG. 17, there will definitely be PGC information which matches the level ID in step 175, so that the processing in step 177 is no longer necessary.

The level ID registering operation shown in FIG. 18 was described as using a personal identification number in the level setting menu which is displayed using the OSD information in the OSD information storage unit 95, although if only a specified user is allowed to set this function, these menus are no longer necessary. As an example, if parents have a special optical disc which stores a level setting menu, the reproduction level may be changed only when such disc is inserted in the reproduction device.

Also, in the above description, management information is recorded across a plurality of VOBUs so that fine branching control may be performed, although it is possible for cases where the same management information is recorded in consecutive VOBUs to simply use a flag as described below to make a saving in the amount of data. In this case, a flag showing the management information is the same as before may be set for the second set of management information onwards, with the reproduction device being set so as to use a previous set of management information when the flag is ON.

The above embodiment described a case where the control data interleaved in a VOB is interleaved in units of GOPs which are the units of compression. Here, the VOBs of a DVD have a variable bit rate, so that when trick plays such as rewind or fast forward are performed a pointer to a next or previous VOB is necessary, which means that control data for trick plays is also provided in a data packet. The unit for the interleaving of this control data packet need not be a GOP, however.

Finally, the present invention described the case where a DVD is used as the read-only disc for the present embodiment, although there is no difference to the effect of the invention if a rewritable disc is used.

Manufacturing Process of the Optical Disc

Figure 21:
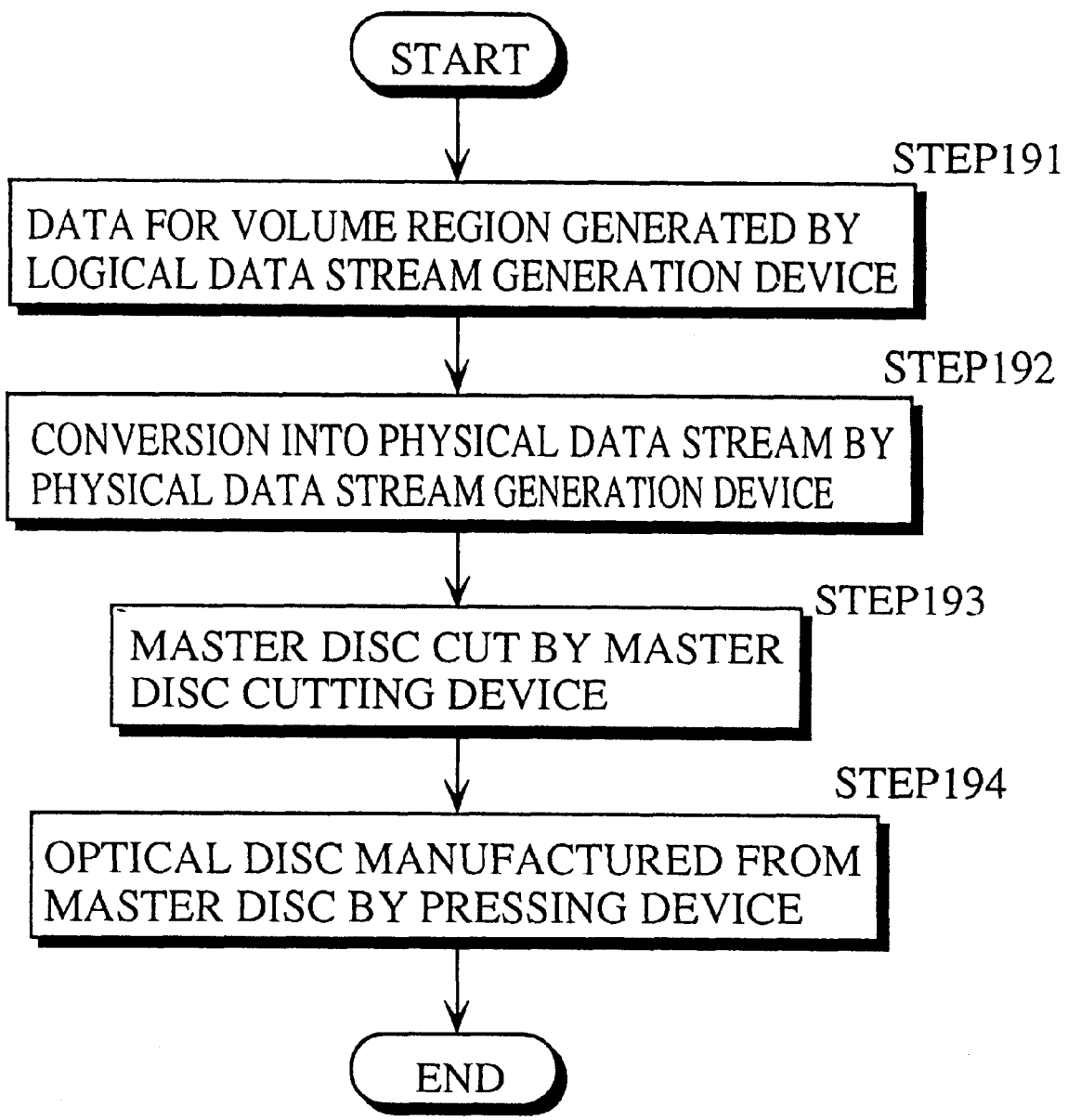
FIG. 21 is a flowchart for the manufacturing process of the optical disc of the present invention.

FIG. 21 shows a flowchart for the manufacturing process of the optical disc in the present embodiment.

First, the data in the volume region shown in FIG. 4 is generated by a logical data stream generation device (step 191). This logical data stream generation device uses multimedia data editing software on a personal computer or workstation and can generate volume data of the data construction shown in FIG. 4. This volume data is recorded onto a transfer medium, such as magnetic tape, and is then converted into a physical data stream by a physical data stream generation device (step 192). This physical data stream is processed using an ECC (error checking code) after data for the lead-in region and data for the lead-out region and the like have been added to the volume data. A master disc cutting process then cuts a master disc for the optical discs using this physical data stream (step 193). Finally, optical discs are manufactured from the master disc by a pressing device (step 194).

The aforementioned manufacturing process can be achieved, with the exception of the part about the logical data stream generation device using the data construction of the present invention, by the same manufacturing equipment as conventional CDs. This is described in "Compact Disc Reader" by Heitaro Nakajima and Hiroshi Ogawa, Ohm Books and in "Optical Disc Systems" by the Applied Physics Society/Optics Discussion Group, Asakura Publishing.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An optical disc comprising:
    a data region for storing a plurality of video sequences composed a plurality of video segments, the video sequences including a plurality of selective video sequences with selection levels which are selectively reproduced depending on the selection levels; and
    a management information region for storing sequence information which indicates a reproduction order of video segments included in each video sequence and indicates positions of the video segments included in each video sequence, sequence-link information indicating which video sequence follows each video sequence, group information indicating which selective video sequences compose a group from which one selective video sequence is selectively reproduced, and sequence-attribute information indicating the selection levels of the selective video sequences, wherein at least one of the video segments includes control information which indicates which video sequence is allowed to be reproduced so as to branch from the corresponding video segment disregarding the sequence information and the sequence-link information, and wherein, when any selective video sequence in a group is allowed to be reproduced disregarding the sequence information and the sequence-link information, the control information indicates only one of all selective video sequences in the group as a representative.

2. An optical disc according to claim 1, wherein each video segment includes a plurality of video data units, and the control information is positioned at a head of one video data unit included in the corresponding video segment and is effective at least during a reproduction period of said video data unit.

3. An optical disc according to claim 2, wherein the data region includes a plurality of sectors arranged to form a spiral track, each of the video data units includes video data stored in successive sectors, and one of the sectors which stores the control information is positioned on the inner-side of sectors which store the video data of the corresponding video data unit.

4. An optical disc according to claim 1, wherein the sequence information includes a plurality of sequence information units respectively assigned to the video sequences, the sequence-attribute information includes a plurality of sequence-attribute information units respectively assigned to the video sequences, and the group information includes a plurality of group information units respectively assigned to the video sequences;

wherein the sequence information units, the sequence-attribute information units, and the group information units are stored in a form of table so as to correspond to one another in such a manner that sequence information units, sequence-attribute information units, and group information units of the selective video sequence composing a same group are assembled together; and wherein each of the group information units indicates whether or not a corresponding one of the video sequences is included in the selective video sequences and whether the corresponding one of the video sequences is a first one, an intermediate one or a last one of the group when the corresponding one of the video sequences is included in the selective video sequences.

5. A reproduction device for an optical disc according to claim 1, comprising:

a reading means capable of reading and reproducing the video segments, the sequence information, the sequence link information, the group information and the sequence-attribute information from the optical disc;

a memory for storing the sequence information, the sequence-link information, the group information, the sequence attribute information and the control information separated from the video segment;

a controller for controlling the reading means, a level registering means for registering an input selection level therein; and an instruction receiving means which is allowed to receive an external instruction during reproduction of the video segment including the control information, wherein the controller controls the reading means to read the sequence information, the sequence-link information, the group information and the sequence-attribute information from the optical disc; controls the reading means to read the video segments in accordance with the sequence information and the sequence-link information; determines, based on the group information, whether or not the video sequence indicated by the control information is included in the selective video sequences when the external instruction is received; controls the reading means, based on the determination result, to read the video sequence indicated by the control information disregarding the sequence information and the sequence-link information when the video sequence indicated by the control information is not included in the selective video sequences; and controls the reading means, based on the determination result, to read one of the two or more selective video sequences, which has a selection level identical to the input selection level registered in the level registering means, disregarding the sequence information and the sequence-link information when the video sequence indicated by the control information is included in the selective video sequences.

6. A reproduction device according the claim 5, wherein the sequence information includes a plurality of sequence information units respectively assigned to the video sequences, the sequence-attribute information includes a plurality of sequence-attribute information units respectively assigned to the video sequences, and the group information includes a plurality of group information units respectively assigned to the video sequences;

wherein the sequence information units, the sequence-attribute information units, and the group information units are stored in a form of table so as to correspond to one another in such a manner that sequence information units, sequence-attribute information units and group information units of the selective video sequences composing the same group area assembled together;

wherein each of the group information units indicates whether or not a corresponding one of the video sequences is included in the selective video sequences and whether the corresponding one of the video sequences is a first one, an intermediate one or a last one of the assembled selective video sequence when the corresponding one of the video sequences is included in the selective video sequences;

wherein the controller determines whether or not the video sequence indicated by the control information is included in the selective video sequences based on a corresponding group information unit; and wherein the controller detects, when the video sequence indicated by the control information is included in the selective video sequences, all selective video sequences included in the same group in which the video sequence indicated by the control information is included.

7. A reproduction device according the claim 5, wherein the level registering means further registers a personal identification number therein together with the input selection level.

8. A method for reproducing an optical disc according to claim 1, comprising the steps of:

reading the sequence information, the sequence-link information, the group information and the sequence-attribute information from the optical disc;

storing the sequence information, the sequence link information, the group information and the sequence-attribute information;

reading and reproducing the video segments in accordance with the sequence information and the sequence-link information;

separating and storing the control information from the corresponding one of the video segments;

receiving an external instruction;

determining whether or not the video sequence indicated by the control information is included in the selective video sequences, when the external instruction is received during reproduction of the video segment in which the control information is included;

reading and reproducing the video sequence indicated by the control information disregarding the sequence information and the sequence-link information when the video sequence indicated by the control information is not included in the selective video sequences; and reading and reproducing one of the two or more selective video sequences, which has a selection level coincident with the input selection level, disregarding the sequence information and the sequence-link information when the video sequence indicated by the control information is included in the selective video sequence.

* * * * *